United States Patent [19]

Moredock

[11] Patent Number: 5,240,593
[45] Date of Patent: Aug. 31, 1993

[54] APPARATUS FOR THE PURIFICATION OF FLUIDS

[76] Inventor: James G. Moredock, 13423 Peregrine St., Jacksonville, Fla. 32225

[21] Appl. No.: 650,785

[22] Filed: Feb. 5, 1991

[51] Int. Cl.$^5$ .............................................. B01D 35/00
[52] U.S. Cl. ......................................... 210/87; 210/90;
210/162; 210/182; 210/232; 210/259; 210/300;
210/305; 210/311; 96/174; 96/218
[58] Field of Search .............. 210/DIG. 5, 774, 799,
210/801, 804, 807, 86, 87, 90, 95, 155, 162, 181,
182, 232, 259, 300, 305, 307, 311, 336, 416.5;
55/208

[56] References Cited

U.S. PATENT DOCUMENTS

| | | | |
|---|---|---|---|
| 652,543 | 6/1900 | Lefebvre | 210/95 |
| 995,402 | 6/1911 | Davis | 210/300 |
| 1,152,399 | 9/1915 | Cronenberger | 210/305 |
| 2,387,035 | 10/1945 | Miller | 210/95 |
| 2,626,709 | 1/1953 | Krieble | 210/300 |
| 3,168,470 | 2/1965 | Rhoda | 210/239 |
| 3,997,886 | 12/1976 | Lerner | 340/236 |

*Primary Examiner*—Bernard Nozick
*Attorney, Agent, or Firm*—Antonelli, Terry, Stout & Kraus

[57] ABSTRACT

A purification method and device for purifying industrial liquid such as oil from contaminates including first container housing for receiving the industrial liquid in bulk and separating liquid and particulate contaminates therefrom by reversing a flow direction of the received liquid. The thus processed liquid is transferred to a second container and is subjected to a further filtration by forcing the liquid under high pressure through at least one filter element accommodated in the second container. The high pressure on the at least one filter element results in a compression of the at least one filter element thereby precluding the liquid being processed from bypassing the filter element. A further filter barrier seal element may be provided above the at least one filter element and serves as a final filtration prior to a discharge of the liquid from the second container.

84 Claims, 10 Drawing Sheets

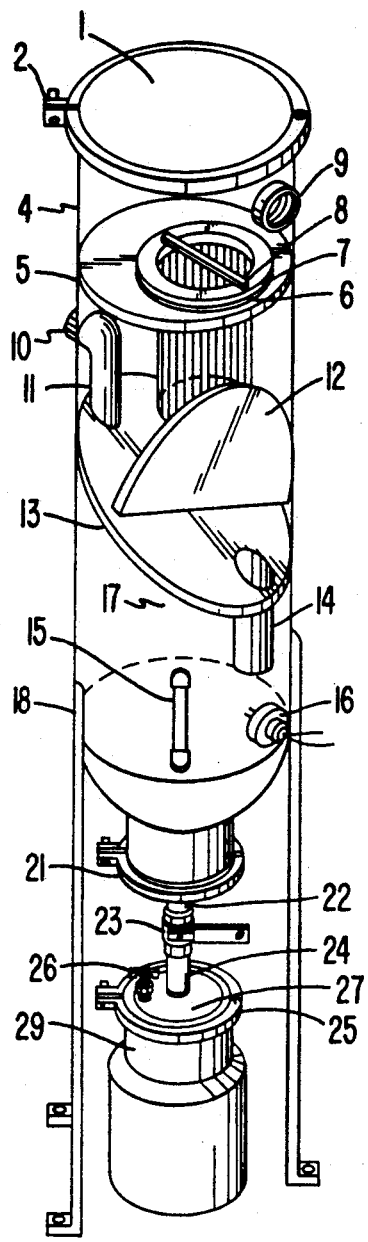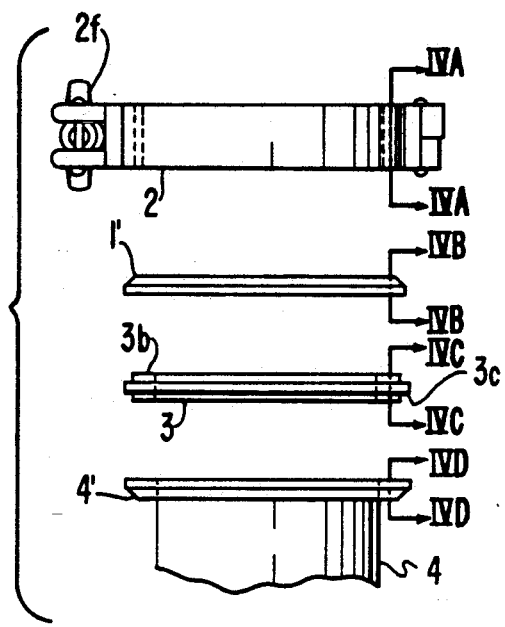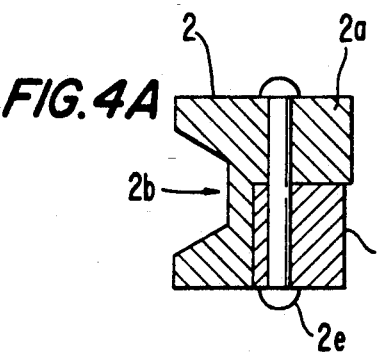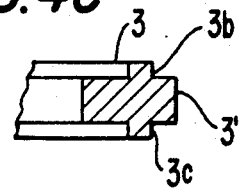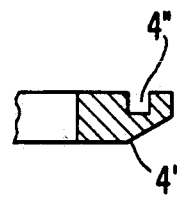

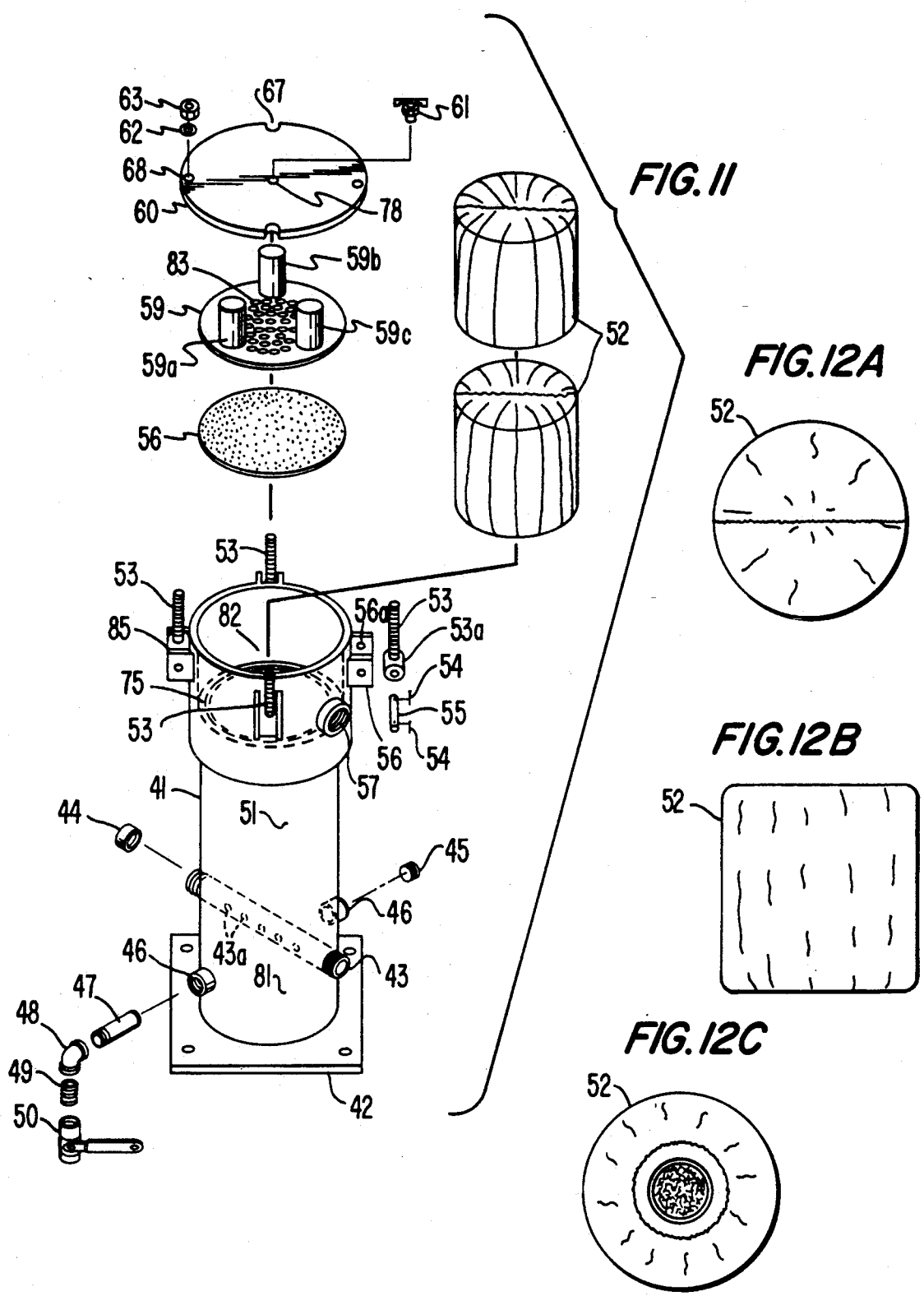

APPARATUS FOR THE PURIFICATION OF FLUIDS

FIELD OF THE INVENTION

The present invention relates to a method and apparatus for purification of fluids, such as, for example, hydraulic fluids, turbine oil, lubricating oil, cleaning fluids, liquid filters, and cutting oils to remove solid contaminates, water, acids, semi-solids, asphaultants, chlorides (NaCl), salts, ammonia, and other volatile contaminates from the oil or fluid by way of a three-dimensional, high density double coalescing filter element and vapor chamber purification.

BACKGROUND OF THE INVENTION

Fluid filters, reclaimers or purifiers of various constructions have been proposed for removing both solid and liquid contaminates from fluids. Since most oils and industrial fluids do not wear out once the solids, water or volatile contaminates are removed from the oil or fluid, once decontaminated, most oils and industrial fluids are suitable for continued use. While most proposed filters do not remove sulfuric acid, those filters which do remove sulfuric acids utilize Fullers Earth which will also remove additives.

One disadvantage associated with proposed reclaiming or purifying arrangements resides in the fact that, for example, such arrangements do not remove solid contaminates, water, acids, semi-solids, asphaultants, chlorides, salts, ammonia, and other volatile components from the oil or fluid in one pass through the proposed apparatus or by the proposed process. In most cases, the proposed arrangements do not remove more than one or two types of contaminates from the fluid or oil being purified or cleaned. Thus, most proposed devices are not "purifiers" in a technological sense and few, if any, currently available apparatus or proposed processes remove the above noted types of contaminates from hydraulic fluid or oil.

Yet a further disadvantage of the proposed arrangements resides in the fact that by virtue of the complex nature of a majority of the existing apparatus, such apparatus tends to lose their efficiency in removing contaminates and maintaining operation over extended periods of time requires constant maintenance attention. An apparatus of this type can generally be classified as centrifugal and vacuum distillation purifiers.

Furthermore, none of the proposed apparatus or processes are designed to remove all types of the above identified contaminates from oil or fluid in single pass, i.e. solid particles to 3μ, semi-solids, asphaultants, bulk and emulsified water, acids, chlorides, salts, ammonia, and other volatile contaminates.

It is extremely critical that any purification device be capable of removing pounds of solids and semi-solid materials and gallons of water without having to have frequent servicing intervals in order to provide consistent and reliable low maintenance performance; however, in the presently available apparatus, if the solid and liquid contaminate levels are too high on the base oil or liquid to be purified or cleaned, it is necessary for such apparatus to be continuously serviced and the quality of the oil or fluid being cleaned is, at best, marginal.

Thus, by virtue of the reduced overall effectiveness of the proposed apparatus and processes, the oil or a fluid product to be purified or cleaned must be run or processed through the apparatus several times.

None of the proposed processes or apparatus are designed to effect the greatest efficiency of the removing of the solid, semi-solid, bulk and emulsified water, acids, chlorides, salts, ammonia, and other volatile contaminates out of oil or fluid products to be purified or cleaned with a relatively maintenance free operation of the apparatus and, generally, the proposed processes and apparatus frequently become overloaded with contaminates thereby causing either a complete shutdown, a bypassing of portions of the apparatus or a greatly reduced flow rates.

Furthermore, inefficient filter materials do not remove acids and, in some cases, may even remove an additive package from the oils or fluids. Moreover, the proposed filter elements are generally donut shaped pleated filter elements or cartridge filter elements which offer only a thin layer of filter material thereby greatly reducing the solid particle load capacity and promoting the oil or fluid products to be cleaned to channel through the filter elements thereby greatly reducing the time the oil or fluid is in contact with the filter media.

SUMMARY OF THE INVENTION

The aim underlying the present invention essentially resides in providing a highly efficient large capacity and easily maintainable single pass method and apparatus for a removal of solids, semi-solids, acids, chlorides, salts, bulk and emulsified water, asphaultants, ammonia, and other volatile contaminates from petroleum and synthetic oils which avoids, by simple means, shortcomings and disadvantages encountered in the prior art.

Another object of the present invention resides in providing an apparatus which minimizes the number of moving parts or elements in the apparatus so as to provide for a low maintenance highly reliable oil or fluid purification or cleaning apparatus.

A further object of the present invention resides in providing a fibrous filter element, which, when compressed by the incoming oil or fluid, creates a pressure that provides a uniformity to the oil or fluid traveling through the filter element without allowing the oil or fluid being purified to channel around the filter element.

Yet another object of the present invention resides in providing a fibrous filter element wherein the fluid or pressure utilized to compress the fibrous filter element creates a fictional barrier at the bottom of the filter element which permits the oil or fluid being processed to pass therethrough but makes it very difficult for water to pass into the filter element thereby creating a coalescing action, with the water settling in the bottom of a barrier chamber housing from which it can be subsequently drained.

A still further object of the present invention resides in providing a relatively easy and cost effective way of disposing of water removed from the oil or other fluid being purified through the utilization of an Aquaevac system on the bottom of a bulk water/particle separator, which system allows water separated from the oil or other liquid being purified to be absorbed into a material that attracts water but not the oil or other fluid being cleaned or purified, with the system being serviceable without turning off or ceasing operation of the purification or cleaning apparatus.

Yet a still further object of the present invention resides in providing an apparatus and process which enables a continuous removal of sulfuric acid by providing a medium for the sulfuric acid to attack and neutralize the same.

A still further object of the present invention resides in providing an apparatus which greatly reduces the time and expertise necessary to service the apparatus as compared to conventional purification or cleaning apparatus.

In accordance with advantageous features of the present invention, an oil/fluid purifying apparatus is provided which includes a bulk water/particle separator including an Aquaevac water removal chamber means having a container, a cover means, an oil inlet means and an oil outlet means, with a wire mesh large capacity strainer means, angle and directional passage way means, water settling area means, sight glass means, electric water sensor means, and a bottom cover means disposed in a container with a full view valve means and the Aquaevac water removal chamber means being attached to the bottom cover means.

Advantageously, in accordance with the present invention, the wire mesh strainer means includes a large round opening in a top area thereof which enables the oil or other fluid being purified to enter the strainer. The wire mesh strainer is provided with a flat bottom portion and round vertical sides, with a lift handle or the like being provided for enabling or facilitating a removal of the wire mesh strainer for maintenance or the like. A gasket or seal means is secured to the top basket lip on the bottom to seal the same to the bulk water/particle separator container means.

Advantageously, in accordance with the present invention, the wire mesh strainer means is gravity seated in the bulk water/particle separator container means and the top cover means includes a lid which has a special grooved surface to accept the sealing gasket that matches the grooved surface with the top of bulk-water particle separator container means. Advantageously, the top cover means and sealing gasket means are secured in place by a V-grooved clamp means. When the top cover is in place on the bulk water/particle separator container means and secured by way of the V-grooved clamp, a vacuum type seal is formed.

Advantageously, the oil inlet means to the bulk water/particle separator container means is located on a vertical side at a position just below the top cover means, with the oil inlet means allowing the oil to enter the bulk water particle separator container means at the top and then drop or descend downwardly through the wire mesh strainer means.

With the apparatus and process of the present invention, it is possible to separate high concentrations of large solid particles from the oil or other liquid being purified by bringing all the incoming oil or liquid under vacuum through the large capacity wire basket means thereby enabling the trapping of pounds of soil material or other contaminates, with the large capacity wire basket means acting as a first coalescing medium means.

By virtue of the provision of a wire basket means in accordance with the present invention, it is possible to provide an apparatus which is capable of accepting a bag type filter insert means thereby allowing for a greater capacity for removing large quantity of particles without reducing the oil flow rate through the bulk water/particle separator container means.

Moreover, the wire basket means of the present invention provides the capability of separating oil or other liquid being processed from water molecules by coalescing the oil or liquid and water through the fine mesh of the wire allowing the larger water molecules which tend to bunch together and fall to the bottom of the wire basket means to form bigger droplets of water in the oil or fluid being processed as the oil or fluid being processed and water leaves the wire mesh means and is pulled or drawn onto angle oval plate means forming a portion of the angle and directional passage way means.

In accordance with still further features of the present invention, the wire basket means and the oval angle plate means are arranged so as to form the directional passage way means whereby the passage way means directs the oil-water mixture that has passed through the wire mesh basket means in such a manner so as to enhance the water molecules to collect together and form droplets of water as the oil-water mixture is pulled or drawn downwardly of the directional passage way means to a downwardly directed oil directional pipe means. The directional passage way means of the present invention offer a large surface area for the water molecules to separate from the oil and attached themselves with other water molecules to form free water droplets as the molecules move toward the downwardly directed oil directional pipe means. By the time the oil-water mixture reaches the downward oil directional pipe means, the mixture has gone through two mechanical coalescing stages.

Advantageously, in accordance with the present invention, the downwardly directed oil directional pipe means is constructed such that all of the oil-water mixture that enters the bulk water/particle separator container means must pass through the pipe means, with the oil-water mixture being pulled or drawn down the directional passage way means and then pulled straight down into a vertical drop of the downwardly directed oil directional pipe means. The heavier water droplets fall down the vertical sides of the pipe means and enter a water settling area. Since the water molecules are heavier than the oil molecules, the water molecules settle quickly onto the bottom of the water settling area.

Advantageously, according to the present invention, the water settling area is constructed such that the downwardly directed oil directional pipe extends vertically into the water settling area. The vertical extension of the oil pipe means has two unique functional relationships to the water settling area. First, the oil-water mixture being drawn or pulled toward the pipe means is slowly moving down the directional passage way means until the mixture converges in the inlet to the downwardly directed oil directional pipe means. By providing the pipe means with an inner-diameter offering a much smaller area for the oil-water mixture to pass through than the directional passage way means, the velocity of the oil-water mixture in the bulk water/particle separator container means is increased as the oil-water mixture enters the downwardly directed oil directional pipe means. The smaller area and increased velocity effect on the oil-water mixture allows the smaller water droplets formed in a directional passage way means to collide and form larger and heavier water droplets.

By virtue of the fact that the smaller water droplets collide and form larger and heavier water droplets, such droplets are accelerated along with the oil in the downwardly directed oil directional pipe means. When the oil-water mixture reaches the end of the downwardly directed oil directional pipe means, the droplets enter the water settling area and instantly enter a still or undisturbed settling area where the acceleration created by the velocity in the downwardly directed oil directional pipe means is almost completely dissipated. Since the oil molecules are lighter in weight than the water molecules, the oil molecules decelerate more quickly and rapidly change direction toward the top of the water settling area and, in a general direction of an upwardly directed oil directional pipe advantageously located 180 degrees across from the downwardly directed oil directional pipe means and located at a position physically higher in the water settling area. The water molecules that are bunched together forming the water droplets are heavier than the oil and do not lose their velocity as quickly when they leave the end of the downwardly directed oil directional pipe means and, when the water droplets enter the water settling area, the water droplets are accelerated and pulled or drawn by gravity to the bottom of the water settling area outside of a main flow of the oil heading in a direction toward the upwardly directed oil directional pipe means located at the top of the water settling area.

As to the disposition of the water that settles in the water settling area, the present invention provides two options, with both options working in conjunction with the sight glass means located on the vertical side of the bulk water/particle separator container means. More particularly, the first water removal option is available through the utilization of a unique Aquaevac water removal chamber means attached to a bottom cover means of the bulk water/particle separator container means by way of the full port valve means. The Aquaevac water removal chamber means may be manufactured to fit any size of purification apparatus. The water that collects in the water settling area is pulled or drawn by gravity into a vertical pipe means and the full port valve means and settles in the Aquaevac water removal chamber means. Since water is heavier than oil, the oil in the Aquaevac water removal chamber means is displaced by the incoming water and, in direct volume proportions, the displaced oil is directed through the pipe means and the full port valve means back into the water settling area. Since the Aquaevac water removal chamber means is an absolutely still or undisturbed area, a turbulent free area is provided for maximum oil water settling separation. An absorbent material means can be placed in the Aquaevac water removal chamber means, with the absorbent material means being in the form of a bag of absorbent material chemically formulated to absorb water but not oil. The absorbent material will absorb water but not oil allowing the special absorbent bagged material to expand as it absorbs the water thereby displacing the oil back into the water settling area of the bulk water/particle separator container means. The absorbent bagged material will absorb the water and change the water from a liquid into a soft solid material that can easily be disposed. Once the absorbent material reaches the maximum capacity for absorbing water it can be removed from the Aquaevac water removal chamber means. Consequently, the sight glass means enables a visual reading of the quantity of water that is settled out in the water settling area.

The second option for disposing of the water that is settled out of the oil in the water settling area of the bulk water/particle separator container means, without the use of the Aquaevac water removal chamber means, can be achieved by providing a drain pipe means attached to the bottom cover of the bulk water/particle separator means, with the drain pipe means being manually operable when water appears in the sight glass means or automatically operated by way of a valve means adapted to be open when a sensor means is activated. If the manual or automatic operation of the drain means is utilized, it would be necessary to shutdown the purifying or cleaning apparatus during the water drain off period; however, such shutdown of the apparatus is not necessary with the use of the Aquaevac water removal chamber means since a suitable piping or conduit means could be provided for attaching the full port valve means and the Aquaevac water removal chamber means to the bulk water/particle separator container means.

In accordance with further features of the present invention, an oil flow control through the water settling area is achieved by virtue of the fact that, after the oil-water mixture exits the downwardly directed oil directional pipe means, the oil must change directions and travel in an upward direction to the upwardly directed oil directional pipe means. The oil must travel the entire width of the water settling area and upwardly allowing a majority of the heavier water molecules that did not separate from the oil as such droplets proceeded through the downwardly directed oil directional pipe means to drop out of the oil and collect with the other water molecules at the bottom of the water settling area. Advantageously, the size of the water settling area is many times larger than the downwardly directed oil directional pipe means and the upwardly directed oil directional pipe means which allows the oil entering the water settling area to move very slowly thereby permitting an extremely high rate of oil water separation. Preferably, the water settling area incorporates approximately one-half of a total height and width of the bulk water/particle separator container means.

In accordance with still further features of the present invention, the upwardly directed oil pipe means is advantageously attached to the oval plate means that forms the top of the water settling area, with the upwardly directed oil pipe means being attached to the oval plate means in such a manner that an oil inlet area thereof is flush with the top of the water settling area. Advantageously, the upwardly directed oil pipe means is about one-half the inside diameter of the downwardly directed oil directional pipe means. This reduction in the inner-diameter size causes the oil entering the upwardly directed pipe means to increase in velocity, with the increase in velocity along the smaller inner-diameter area of the upwardly directed oil pipe means forcing the remaining water molecules to come into contact or collide thereby forming larger and heavier water droplets that, by virtue of their weight and effects of gravity, begin to fall down the upwardly directed oil pipe means against the velocity of the upward moving oil molecules heading toward the oil outlet means of the bulk water/particle separator container means. As the water droplets fall down against the oncoming oil in the upwardly directed oil directional pipe means, the water droplets continue to grow in size and weight and attract other water molecules trapped in the oil to attached themselves to bigger water droplets. When the water droplets fall out of the upwardly directed oil directional pipe means, the water droplets enter the still or calm area of the water settling area and settle on the bottom of the water settling area chamber means.

Advantageously, in accordance with further features of the present invention, the upwardly directed oil directional pipe means extends vertically straight up and then is bent horizontally 90 degrees and attached to the inside of the oil outlet means attached to the vertical side of the bulk water/particle separator container means.

According to the present invention, a vacuum gauge or sensor means is attached to the bulk water/separator container oil outlet means for sensing an amount of vacuum created by a resistance to the oil flow resulting from the operation of the bulk water/particle separator container means. When the vacuum sensed exceeds 15 inches of mercury, it is time to service the wire mesh strainer means in the bulk water/particle separator container means.

In order to create a proper vacuum to operate the bulk water/particle separator container means and provide the proper flow rate and oil pressure required to compress the fibrous element filter means located in the housing container means, according to the present invention, a positive displacement pump means is connected by suitable piping to the outlet means of the bulk water/particle separator container means.

In order to permit the oil operating pressure inside of the housing container means accommodating the fibrous filter means to be adjusted in order to compress the fibrous filter means to an optimum capacity to create the most effective frictional barrier means along a bottom horizontal edge of the fibrous filter means, a manually adjustable pressure reducing valve means is provided and located in a piping or conduit means connected to both the incoming pipe means connected to the positive displacement pump means and an outgoing or discharging piping or conduit means connected to the positive displacement pump means. In this connection, different oils require different blends of fibrous filter means and different operating pressures to create the most efficient frictional barrier means. The pressure reducing valve means allows a fine tuning of the purification or cleaning apparatus to almost any oil purification application.

In accordance with still further features of the present invention, an oil flow metering sensing device is provided for measuring a rate of oil flow through the positive displacement pump means and provide a manner by which it is possible to determine when the fibrous filter element needs to be serviced.

Advantageously, in accordance with yet further features of the present invention, a pressure gauge is attached to the outlet of the oil flow meter sensing means for providing an indication of a pressure of the oil entering the housing container means, with the pressure gauge means also providing an exact oil pressure reading when adjusting the pressure reducing valve means.

An oil inlet manifold means is attached to the housing container means with the oil inlet manifold means having, in accordance with the present invention, two oil inlet openings on opposite sides of the housing container means. Oil entering the oil inlet manifold means is released into a coalescing chamber means through, for example, eight horizontal evenly spaced holes, with the configuration, location and number of the holes in the inlet oil manifold means allowing the oil to reduce the flow velocity thereof and change a directional flow pattern from horizontal to vertical as the oil enters the coalescing chamber means. The directional flow pattern changes along with the corresponding reduction in the flow velocity results in a creation of a coalescing action, with water molecules that fall out of the oil collecting in the bottom of the coalescing chamber means.

According to the present invention, the coalescing chamber means is constructed so as to allow for a large still or undisturbed area between a horizontal bottom portion of the housing container means and a horizontal bottom edge of the fibrous filter means where the oil, still under pressure, loses a majority of the flow velocity allowing the heavier water molecules to settle out and fall to the bottom of the coalescing chamber means. The area where the coalescing chamber means meets the fibrous filter elements forms a significant feature of the present invention since the area between the fibrous element means and the top of the coalescing chamber means forms a frictional barrier means. As the fibrous element means are compressed by the incoming oil under pressure, it becomes more difficult for the oil to enter the fibrous element means. Since oil is lighter in weight and has less static tension than water, the oil passes through the frictional barrier means easier than the water molecules and the oil enter the bottom of the fibrous element means. The water molecules that are separated from the oil as the oil enters the frictional barrier means settles into the bottom of the coalescing chamber means.

By virtue of the formation of the frictional barrier means where the fibrous element means and the coalescing chamber means meet while under the pressure of the oil, the frictional barrier not only deters water molecules from entering the fibrous element means but also offers a barrier that prevents solid particles above 50$\mu$ in size from entering the fibrous element means. The solid particle settle out of the oil on the bottom of the coalescing chamber means and semi-solid materials such as asphaultants, varnishes and sludge have a very difficult time going through the frictional barrier means and entering the compressed fibrous element means. The relationship formed between the coalescing chamber means and the horizontal bottom edge of the fibrous element means under operating oil pressure allows for a simple yet precise manner of increasing the compression on the fibrous element means to lower the $\mu$ rating of the fibrous element means and increase the tension in the frictional barrier means.

The fibrous element means in accordance with the present invention is advantageously constructed for specific types of oil products to be purified or cleaned and, advantageously, includes solid cylindrical elements incased in a bag means fashioned of, for example, a cotton material. The bag means is open at one end which is provided with a means for closing such open end such as, for example, a string cord means sewed into a lip of the bag means for allowing the string cord means to be pulled tight leaving a small centrally disposed opening means. As readily apparent, the fibrous element can be constructed in any size so that the exact size and overall length of the fibrous element meets the specification of a particular application. This advantageously eliminates the problem of oil being able to channel through the fibrous material means due to uneven compacting and shape distortion caused by hand packing methods used by most fibrous element makers.

In this connection, advantageously, a hydraulic compacting machine is employed to manufacture the fibrous element means with the compacting machine being adapted to provide for a consistent fibrous element means and being readily adjustable to make all size of fibrous element means as required. The hydraulic compacting machine allows for a hydraulic compacting of the fibrous element material from 1 PSI to 2,000 PSI, with the broad range of compacting availability allowing for a fine tuning of the actual fibrous element means for almost any oil product application to be purified or cleaned.

By virtue of the manufacturing process of the fibrous element means in accordance with the present invention, it is possible to manufacture the fibrous element means to varying $\mu$ ratings. This is extremely important since many of the oils to be purified or cleaned have very specific $\mu$ filtration specifications that must be maintained if the oil additive packages are not to be damaged.

By hydraulically compressing the fibrous element means in accordance with the present invention, in a cotton bag, a finished fibrous element means is provided which has the shape of an interior of a chamber means in the housing container means for accommodating the fibrous element means. The fibrous element means represents a significant advance over conventional fibrous element means since the fibrous element means is shaped to fit snugly with no irregular bulges or indentations into the fibrous element chamber means area in the housing container means. This latter feature guarantees that the fibrous element means will seal to the sides of the fibrous element chamber means which is extremely significant, since if the fibrous element means does not seal to the fibrous element chamber means, the frictional barrier means created along the bottom horizontal edge of the fibrous element means as the fibrous element is compressed by the oil pressure will not form and a large portion of the oil product to be purified will channel or bypass the fibrous element means thereby leaving the housing container means in an unpurified or uncleansed state.

In this connection, almost all conventional coverings utilizing fibrous bag filter means do not have a fibrous filter construction for properly addressing the oil channeling bypass problem. More particularly, even if conventional arrangements are provided with oil flow control device means for oil entering into and out of the fibrous filter chamber means, the conventional arrangements provide no way of assuring that the oil product to be filtered actually proceeds through the fibrous filter means and not around the fibrous filter means. Moreover, conventional constructions fail to control the oil flow through the fibrous filter means in a consistent manner to prevent oil channeling through a light weight or hand compacted fibrous filter means. Additionally, even if metal canister means are utilized to maintain the fibrous filter material, such arrangement could not prevent the oil that entered the filter canister means from channeling around the fibrous filter material and around the interior of the metal canister filter container means.

Additionally, almost all conventional approaches address the oil channeling and bypass problem with the use of an oil flow control metering orifice means; however, this oil flow control technique is only marginally successful and does not provide consistent results for a number of reasons. More particularly, the methods of compacting the fibrous material means vary widely but, in most conventional devices, the compacting of the fibrous filter material is carried out by hand or with a minimal mechanical compacting. Since the prior art devices poorly compact the fibrous filter, even when the incoming oil is metered at a very low volume, the oil loses oil pressure and thereby the fibrous filter is slowly saturated by the oil as the canister means is being slowly filled. By virtue of the provision of the flow control orifices on the conventional devices, there is very little internal oil pressure on the fibrous filter material that would cause any significant compacting of the fibrous filter material Consequently, with conventional approaches, the oil flow takes the path of least resistance to flow through or around the fibrous filter material; however, the present invention avoids this disadvantage by providing a manufacturing technique which enables the use of a fibrous filter element means that has uniformity in compaction thereby eliminating oil channeling and aiding in the sealing of the fibrous filter element means to the fibrous element chamber means.

The fibrous filter element means of the present invention are constructed so as to perform the function of an oil flow control means and a pressure reducing means. Flow control is achieved by the amount of incoming oil pressure against the compacted fibrous filter element means and the blend of the fibrous element material means. By adjusting the pressure reducing valve means within an operating pressure range of 5 to 90 PSI two automatic adjustments are made in the housing container means accommodating the fibrous filter element means. First the incoming oil fills the coalescing chamber area means in the housing container means and then the oil comes in contact with the bottom of the fibrous filter element means. By virtue of the fibrous filter element means being manufactured in accordance with the present invention, it is highly compacted and fits the fibrous element chamber means snugly. The on rush of oil tries to find a way around the fibrous filter element means; however, because there is no flow control metering orifice, the oil flow rate is so great that the oil begins to back up in the coalescing chamber area creating resistance to the oil flow and results in a building up of the oil pressure in the coalescing chamber area. As the oil pressure builds, the oil pressure begins to compress the fibrous filter element means upwardly and, as the oil pressure continues to build and the fibrous filter element means continues to compress, it becomes impossible for the oil to flow anywhere except through the fibrous filter element means. Secondly, as the oil is pressed through the fibrous filter element means, the oil loses the pressure and the upward flow velocity, so that, by the time the oil reaches the top of the solid fibrous filter element means, the oil pressure has dropped below 1 PSI and the oil is now cleaned to 3–5$\mu$ acid free, water free, salt free, semi-solid free, and is ready to move to the next stage of purification.

The flow control feature of the present invention differs from conventional techniques since no small orifices are provided which can clog and stop the oil flow into the apparatus. Moreover, the present invention utilizes the oil pressure to regulate the oil flow rates once the oil pressure is set up and running and a drop in the flow rate or increase in oil pressure readily apprises the user of the apparatus that it is time to service the apparatus by changing the fibrous filter element means. Unlike conventional techniques, with the present invention, it is impossible to stop the oil flow through the apparatus since the oil inlet manifold means has no mechanical orifice means. In this connection, most conventional techniques achieve the oil gravity return design by limiting the oil flow into the device through the use of an oil flow control orifice means. By virtue of the technical features of the present invention, it is possible to utilize a wide range of fibrous filter material to make the fibrous filter element means thereby enabling the present invention to be utilized to clean a wide range of oil and oil related fluids. Flow rates of the oil or fluid through the apparatus of the present invention will vary depending upon the material of the fibrous filter element means used and the type of oil product to be purified or cleaned. In this connection, most conventional devices are designed to reclaim, filter, or purify a particular type of oil or oil related fluid.

The present invention provides the advantage of the selection of the fibrous element material, thereby enabling the construction of a fibrous filter element means to be blended to remove acids, salts, chlorides, water, semi-solids, and solids up to $3\mu$ and asphaultants in one pass through the apparatus. Conventional techniques have not developed the range of blended material for the fibrous filter element means nor the manufacturing technology to provide consistent purification results as are achieved by the present invention.

In accordance with yet further features of the present invention, a barrier filter/seal element means is provided, with the barrier filter/seal elements means being fashioned as a flat circular absolute $\mu$ rated filter material that performs three important functions. First, the barrier filter/seal element means acts as the final filter media through which the oil being purified or cleansed passes through. Second, the barrier filter/seal element means acts as the seal means that absolutely seals the fibrous filter element means in the housing container means. By sealing the fibrous filter element means into the housing container means, any possibility of the oil product channeling or bypassing is completely eliminated. Thirdly, the barrier filter/seal element acts as a bonding agent for sealing and directing the oil flow from the fibrous filter element chamber means into the oil passage way on a dispersion/hold down plate means.

Since, in accordance with the present invention, all the oil being purified must enter the barrier filter/seal element means through the fibrous filter element means, the oil is distributed in an even pattern and only leaves the barrier filter/seal element means through a series of circular oil directional hole means in a dispersion/hold down plate means. The high density barrier filter/seal element means absolutely prevents oil from channeling and distributes the oil leaving the fibrous filter element means in a slow consistent velocity movement to the bottom of the oil passage way hole means of the dispersion/hold down plate means.

In accordance with the present invention, the housing container means accommodating the fibrous filter element means is constructed as a three component part so as to define a mechanical sealing area incorporating two other functional parts of the housing container means. With such an arrangement, a static seal is formed thereby forcing all of the oil leaving the fibrous filter element means to go through the barrier filter/seal element means and up through the oil directional holes in the dispersion/hold down plate means leaving the oil in an evenly dispersed thin layer in an evaporation/oil collection chamber means. In accordance with the present invention, the dispersion/hold down plate means is constructed so as to hold down the barrier filter/seal element means and the fibrous filter element means by evenly distributing the upward force created by the incoming oil pressure over a horizontal bottom diameter of the fibrous filter element means. The upward pressure can exceed 5,000 pounds of lift and, for this purpose, the dispersion/hold plate means advantageously is fashioned with three solid column means attached in a triangular pattern to allow the upward lift force to be distributed evenly on the container cover means. Moreover, the dispersion/hold down plate means of the present invention also forms a bottom facing interface seat means which forms the two parts of the static seal means.

The evaporation/oil collection chamber means of the present invention acts as both an oil collection area means and, if the housing container is provided with an operational heated container cover means, also forms an evaporation chamber for the removal of volatile contaminates. The dual purpose of evaporation/oil collection chamber means of the present invention allows the same housing container means to be used to purify a full range of oil products. If the oil products to be cleaned do not have volatile contaminates, the evaporation/oil collection chamber means utilizes a standard container cover means and acts only as an oil collection chamber area collecting the clean oil product and passing the clean oil product to the oil outlet means. When the evaporation/oil collection chamber means is used, a vent cock means may be closed for allowing the oil product to fill up the entire oil collection chamber area and push or urge the clean oil product out of the housing container means, which is a feature not available in most conventional apparatus. If the oil product to be purified contains light volatile contaminates, the heated container cover means is used and turns the evaporation/oil collection chamber area means into a very efficient evaporation chamber means.

Advantageously, the heated container cover means is constructed such that the heated element is sealed in a concentric heat transfer block means that protrudes downwardly into the evaporation/oil collection chamber. The oil product that is being purified is never allowed to contact the concentric heat transfer block means and, for this purpose, the concentric heat transfer block means extends downwardly into the evaporation/oil collection chamber means to a point above the top of the oil outlet means. When the heated container cover means is utilized, the housing container means is advantageously provided with a gravity return oil outlet means. Even at maximum oil flow rate, the oil leaving the evaporation/oil collection chamber means never fills more than one-half of the oil outlet means. The container cover vent is a Tee drilled plug which allows a venturi syphoning effect which evacuates vapors from the evaporation/oil collection chamber.

The container cover means may, in accordance with the present invention, be provided with thermostatic and electrical connection means on the interior thereof that is water tight and constructed so as to function in the most adverse environments, with the container cover means being attached to the center top portion thereof.

The container cover means may, in accordance with the present invention, be secured in place by four T-bolt stud means with a nut and washer means for allowing a compression of the fibrous filter element means to be properly compressed into the housing container means without the use of any special tools. The four Tee-bolt stud means are sized so as to hold the entire housing container together under an upward pressure exerted on the housing container means during the operation of the apparatus of the present invention.

The above and other objects, features, and advantages of the present invention will become more apparent from the following description when taken in connection with the accompanying drawings which show, for the purpose of illustration only, several embodiments in accordance with the present invention.

BRIEF DESCRIPTION OF THE DRAWINGS

FIG. 3 is a perspective detail view of a bulk water/particle separator and Aquaevac water removal chamber of a purification device constructed in accordance with the present invention;

FIG. 4 is an exploded view of a lid or cover of the bulk water/particle separator of FIG. 3;

FIG. 4A is a cross-sectional view taken along the line IV A—IV A in FIG. 4;

FIG. 4B is a cross-sectional view taken along the line IV B—IV B in FIG. 4;

FIG. 4C is a cross-sectional view taken along the line IV C—IV C in FIG. 4;

FIG. 4D is a cross-sectional view taken along the line IV D—IV D in FIG. 4;

FIG. 11 is an exploded view of a barrier purifier housing container assembly constructed in accordance with present invention;

FIG. 12A is a top view of a solid fibrous element for the barrier purifier housing container constructed in accordance with the present invention;

FIG. 12B is a side view of the solid fibrous element of FIG. 12A;

FIG. 12C is a bottom view of the solid fibrous element of FIG. 12A;

DETAILED DESCRIPTION

Figure 1:
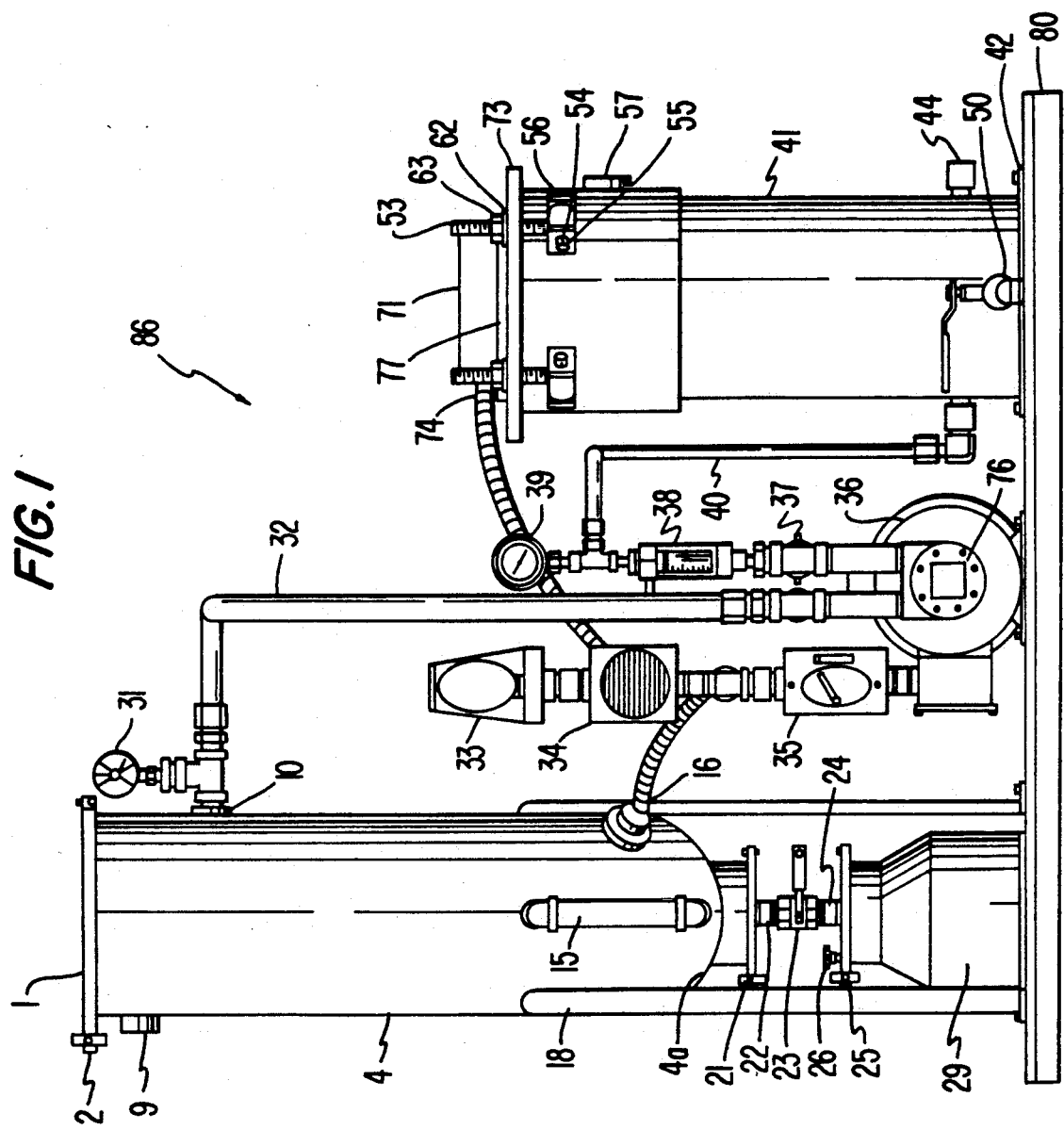
FIG. 1 is a partially schematic front view of an oil or fluid purification device constructed in accordance with the present invention.

Referring now to the drawings when like reference numerals are used throughout the various views to designate like parts and, more particularly, to FIG. 1, according to this figure, an oil purification device generally designated by the reference numeral 86 includes a bulk water/particle separator housing container 4 having a top cover assembly 1 at one end thereof, with the top cover assembly 1 being secured in place by a V-grooved clamp 2. The housing container 4 is held in an upright position by, for example, three vertically disposed mounting legs 18, each of which is provided at a lower end thereof with aperture horizontal feet for enabling a securing of the housing container 4 to a suitable support surface, such as, for example, a frame 80. An oil inlet 9 and oil outlet 10 are provided in an upper area of the housing container 4, with a suitable sight glass means 15 being provided in a lower region of the housing container 4 for enabling a monitoring of the fluid level. A water level sensor 16 is provided in the lower region of a housing container 4.

The oil outlet 10 is in communication with a positive displacement pump 76 through a piping or conduit 32 with a conventional vacuum gauge 31 being arranged in the piping 32 between the oil outlet 10 and the positive displacement pump 76.

The oil leaves bulk water/particle separator container housing 4 through the oil outlet 10 where the vacuum gauge 31 monitors the amount of resistance through oil flow measured in inches of mercury created in the bulk water/particle separator container housing 4. An electric motor 36 drives the positive displacement pump 76 creating the vacuum required to pull the oil through the bulk water/particle separator container housing 4 and push the oil through a housing container 41 in a manner described more fully hereinbelow.

An ON/OFF electrical control switch 35 is attached to the electric motor 36 and, for example, an audible alarm 34 and strobe light alarm 33 may be attached to the ON/OFF electrical control switch 35. The audible alarm 34 and the strobe light 33 are electrically attached to the water sensor 16 on the container housing 4. When the ON/OFF electrical control switch 35 is in the ON position, the water sensor 16 is activated, and when the water level reaches the water sensor 16, the water sensor 16 sets off the audible alarm 34 such as, for example, a speaker, horn, bell or the like, and the strobe light alarm 33 indicating a need to service a water removal chamber 29 provided at the lower end of the container housing 4. If the audible alarm is a speaker, the speaker may, for example, be mounted or encased in a protective box means secured to either the ON/OFF electrical control switch 35 or to an electrical control box panel means.

Figure 2:
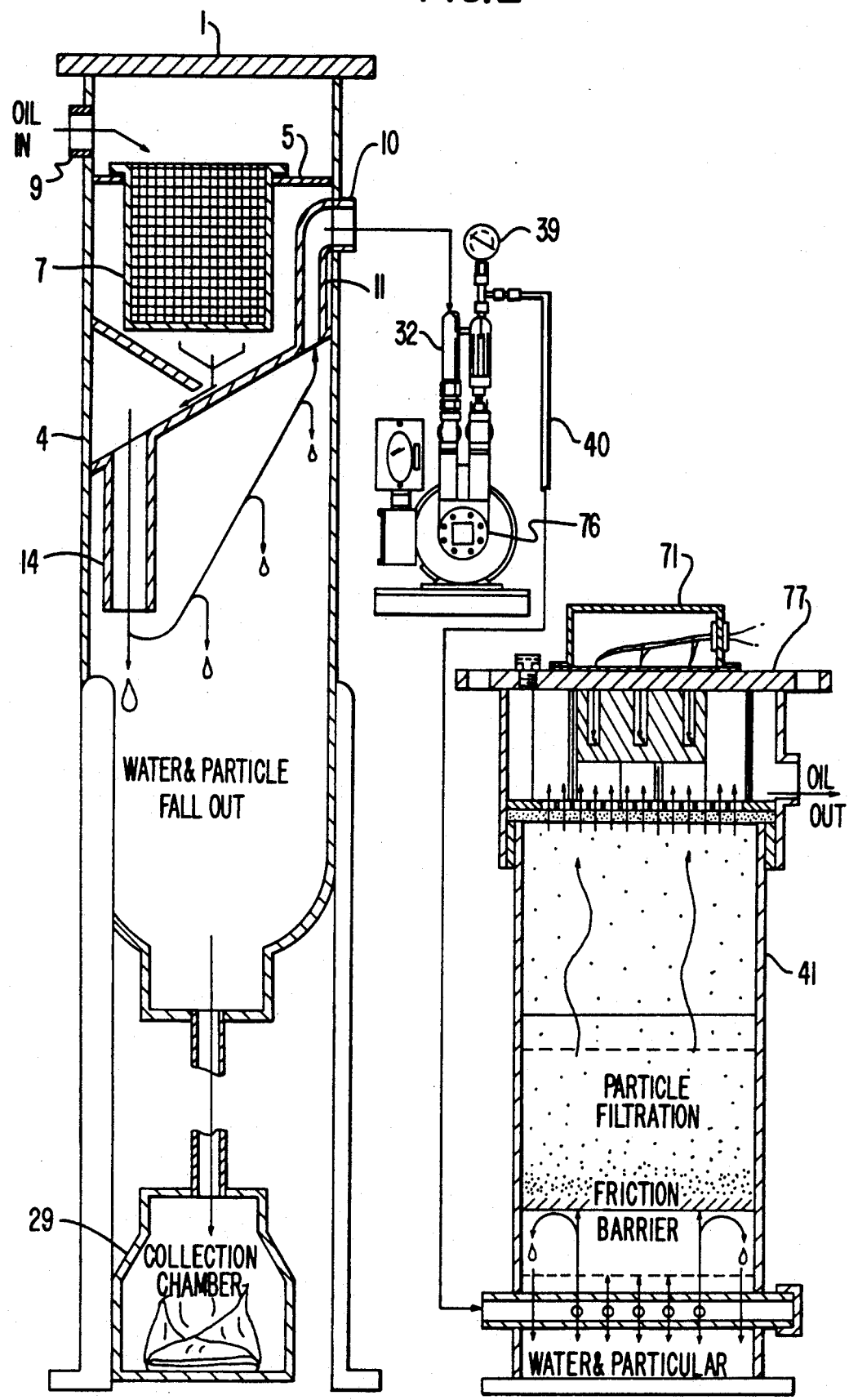
FIG. 2 is a partial constructional schematic view depicting the oil or fluid through the purification device of FIG. 1.
Figure 5:
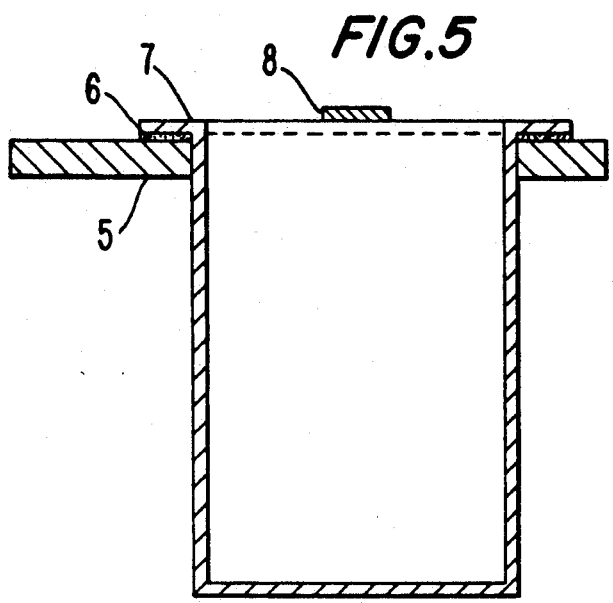
FIG. 5 is a cross-sectional detail view, on an enlarged scale, of a wire mesh strainer and seal seat in the bulk water/particle housing container of FIG. 4.
Figure 6:
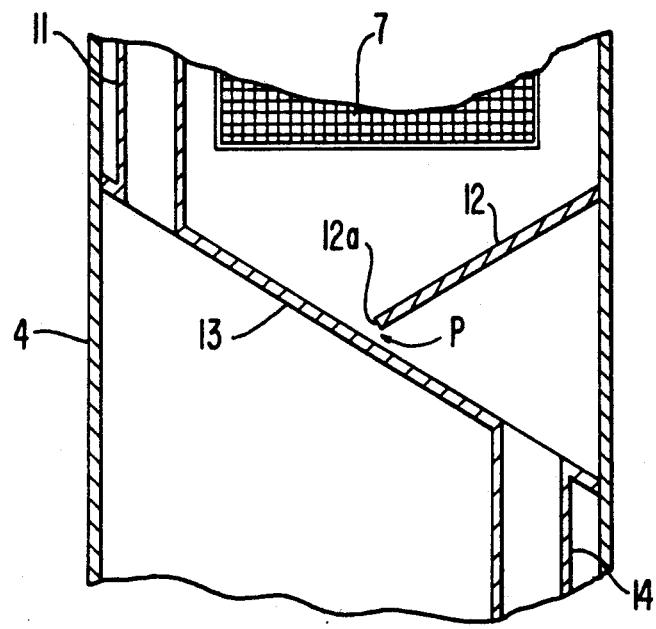
FIG. 6 is a cross-sectional detail view, on an enlarged scale of angle oil directional passage ways oval plates and relationship thereof to downwardly directed and upwardly directed oil directional pipes in the bulk water/particle separator of FIG. 4.

As shown in FIGS. 2 and 3, the oil inlet 9 allows the oil into the bulk water/particle separator container housing 4 and directs all the oil into a wire mesh strainer basket 7 gravity seated to strainer basket seating flange 5 (FIG. 5) and compressing a strainer basket lip seal 6 for forming an absolute seal around the edge of the wire mesh strainer basket 7 directing all the oil received around a strainer basket servicing handle 8 (FIGS. 3 and 5) and into the opening of the wire mesh strainer basket 7.

The oil products leave the wire mesh strainer basket 7 and enter the half oval plate 12 and full oval plate 13 where the water is coalesced out and directed in a downwardly directed pipe 14. The oil flows out of the downwardly directed pipe 14 into a water settling area 17 where the oil slowly travels upward to an upwardly directed pipe 11 and exits out the oil outlet 10 attached to the upwardly directed pipe 11 and mounted at 180 degrees opposite the oil inlet 9. The water that has been coalesced out of the oil settles in the water settling area 17 so as to enable a monitoring by the sight glass means 15 and water sensor as the water settles into the bottom of the container housing 4 from where it enters a water removal chamber 29 attached to the bottom of a cover 20 (FIG. 8) of the separator housing 4, with the cover 20 being provided with a full view valve assembly 23.

Figure 8:
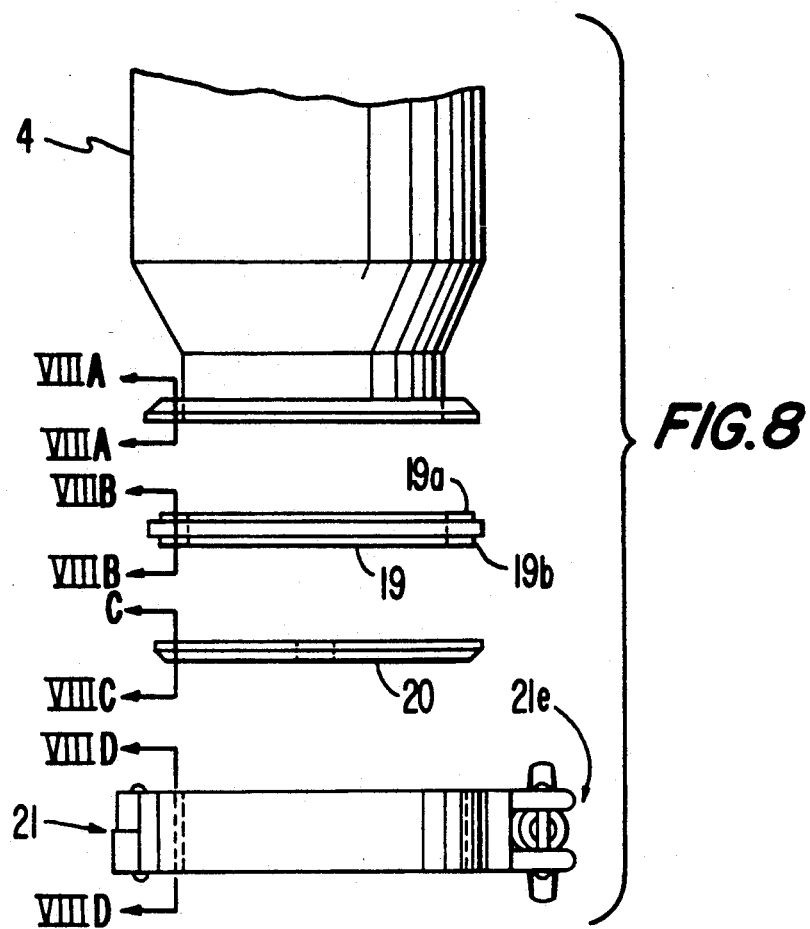
FIG. 8 is an exploded view of a bottom lid of the bulk water/particle separator of FIG. 4.

As shown most clearly in FIGS. 3 and 8, a bottom cover assembly includes a bottom cover or lid 20 is held in place by a V-grooved clamp 21 and sealed to the separator container housing 4 with a cover or sealing gasket means 19 (FIG. 8). A conduit or piping 22 (FIGS. 1 and 3) is attached to the bottom cover or lid 20. The full port ball valve 23 is attached to the piping or conduit 22 as well as to the piping or conduit 24.

The piping or conduit 24 is attached to a cover 27 of a water removal assembly disposed at the lowest part of the container housing 4 for allowing the water to be removed from the separator container housing 4 without shutting down the oil flow. In addition to the cover 27, the water removal chamber assembly includes, as shown most clearly in FIG. 3, a V-grooved clamp 25, cover gasket 28, air bleeder valve 26, and housing container forming the water removal chamber 29, along with a water absorbent bag filter 30. The water absorbent bag filter 30 is adapted to absorb water but not oil allowing for a safe and easy manner of disposing of waste water.

As shown in FIG. 3, the bulk water/particle separator container means 4 incorporates an angle oil directional passage way including a half oval plate means 12 welded in the bulk water/particle separator container means 4 just below the wire mesh strainer means 7 at a downward sloping angle of 120° and, directly opposite the half oval plate means 12, is a full oval plate means 13 welded in the bulk water/particle separator container means 4 at a downward sloping angle of 120°. Advantageously, the full oval plate means 13 extends to within one-half inch of intersecting with the leading edge 12a of the half oval plate means 12 so as to form an oil passage way means generally designated by the reference character P for directing the oil flow in a downward pattern and into the downwardly directed oil directional pipe means 14 welded to the full oval plate means 13 at a 120 degree angle butting up to but not touching the vertical side of the bulk water/particle separator container means. The oil directional pipe means 14 is always at least twice the diameter of the oil outlet means 10, and the oil directional pipe means 14 maintains a parallel arrangement with the vertical side of the bulk water/particle separator container means 4 over an entire length thereof.

All of the oil that enters the bulk water/particle separator container means 4 must travel down the two oval directional plate means 12, 13 and enter the oil directional pipe means 14. When oil leaves the oil directional pipe means 14, the oil must change direction and travel in an upward direction toward the oil outlet means 10 by passing through an upwardly directed oil directional pipe means 11 that is welded to a high side of the full oval plate means welded to the bulk water/particle separator container means. The upward directional pipe means 11 is preferably one-half a diameter of the downwardly directed directional pipe means 14. The directional pipe means 11 is welded at a 120 angle to the downward sloping oval plate means 13 which makes the upwardly directed directional pipe means 11 maintain a parallel arrangement with the vertical side of the bulk water/particle separator container means 4 along an entire length thereof. The upwardly directed directional pipe means 11 turns 90° and is welded to the oil outlet means 10. The oil outlet means is incorporated into the bulk water/particle separator container means 4 on a vertical side thereof 180° slightly downwardly and across from the oil outlet means 9 located just below the top cover assembly 1.

As shown in FIG. 4, the top cover assembly 1 includes a V-shaped clamping ring 2, lid or cover 1' and sealing gasket means 3. As shown in FIGS. 4A and 4D, the lid or cover 1' is provided with a groove or notch 1", and a flange 4', provided at an upper end of the bulk water/particle separator container means 4, is provide with a corresponding groove or notch 4" adapted to respectively accommodate annular projections 3b, 3c (FIG. 4C) of the sealing gasket means 3. The lid or cover 1' and the sealing gasket means 3 are secured to the flange 4' by the clamping ring 2 fashioned from two annular rings 2a, 2c, with the annular ring 2a providing a V-shaped groove 2b for accommodating the peripheral edge of the flange 4', sealing gasket means 3 and lid or cover 1'. The two annular rings 2a, 2c are suitably joined at one peripheral portion thereof by a pin means 2e and, at an opposite position by a suitable conventional fastening arrangement 2f (FIG. 4).

A water settling area is located in a lower section of the bulk water/particle separator container means 4 and incorporates an area beneath the full oval plate means 13 and is partially penetrated by the downwardly directed directional pipe means 14. The vertical sides of the bulk water/particle separator container means 4 encase the water settling area formed in part by, for example, a dish-shaped bottom cover means 4a forming the bottom boundary area of the bulk water/particle separator container means 4. The dish-shaped bottom cover means may be fashioned as an independent member secured to the main portion of the water/particle separator means 4 or may be integrally formed therewith. Oil passes out the downwardly directed directional pipe means 14 and enters the water settling area. The oil then changes directions and flow upwardly out of the water settling area and into the upwardly directed oil directional pipe means 11. The directional flow change of the oil causes water mixed with the oil to settle out of the oil and remain in the water settling area.

Figure 7:
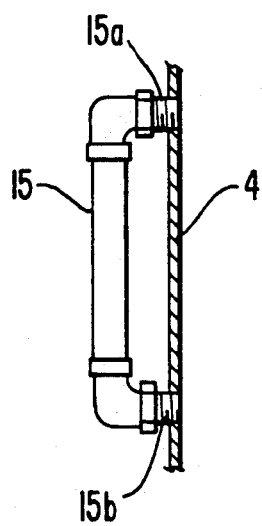
FIG. 7 is a cross-sectional side view of a sight glass provided on the bulk water/particle separator of FIG. 4.

The sight glass means 15, as shown most clearly in FIG. 7, is attached in two places to the vertical side of the bulk water/particle separator container means 4. The upper connection of the sight glass means 15 is arranged, as shown most clearly in FIG. 3, just off the dish-shape bottom cover means 4a and at 180 degrees from the lower end of the downwardly directed oil directional pipe means 14 on the vertical side of the bulk water/particle separator container means 4. The sight glass means 15 is a clear tube that allows for visual observation to determine when to service the water removal system means. The water sensor 16 is attached on the vertical side of the bulk water/particle separator container means 4 at a position about half way between the attaching means 15a, 15b (FIG. 7) of the sight glass means 15. The water sensor 16 is adapted to activate, for example, the strobe light 33 and/or an audible alarm 34 when the water level in the settling area reaches a vertical height of the water sensor 16.

Figure 8A:
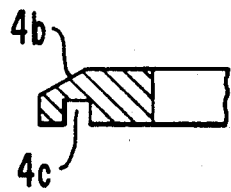
FIG. 8A is a cross-sectional view taken along the line VIII A—VIII A in FIG. 8.
Figure 8B:
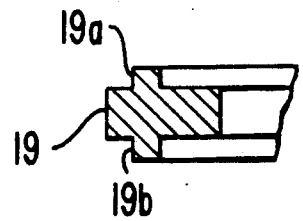
FIG. 8B is a cross-sectional view taken along the line VIII B—VIII B in FIG. 8.
Figure 8C:
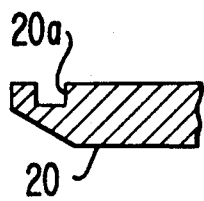
FIG. 8C is a cross-sectional view taken along the line VIII C—VIII C in FIG. 8.
Figure 8D:
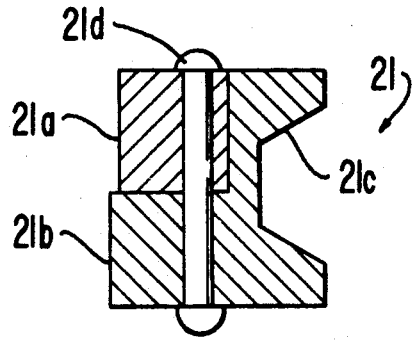
FIG. 8D is a cross-sectional view taken along the line VIII D—VIII D in FIG. 8.
Figure 9:
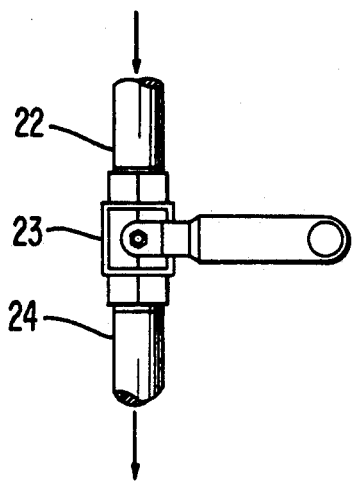
FIG. 9 is a detail view of a piping and valve assembly for connecting the Aquaevac water removal chamber to the bulk water/particle separator bottom lid cover constructed in accordance with the present invention.

The bottom of the water/particle separator container means 4 terminates, as noted above, in a bottom cover assembly including, as shown most clearly in FIG. 8, the lid or cover 20, the cover or sealing gasket means 19 and the V-shaped clamping ring 20. As shown in FIGS. 8A and 8C, the lid or cover 20 is provided with a groove or notch 20a and a flange 4b at the bottom of the water/particle separator container means 4 is provided with a corresponding groove or notch 4c, with the grooves or notches 4c and 20a being adapted to respectively accommodate angular projections 19a, 19b of the sealing gasket means 19. The lid 20 and sealing gasket means 19 are secured to the flange 4b by the clamping ring 20 fashioned, for example, from two angular rings 21a, 21b, with the angular ring 21b providing a V-shaped groove 21c for accommodating the peripheral edges of the flange 4b, sealing gasket means 19 and lid 20. The two angular rings 21a, 21b are suitably joined together at one peripheral position by a pin means 21d and an opposite peripheral position by a suitable conventional fastening arrangement 21e. When the bottom cover assembly is secured in place by the clamping ring 20, a vacuum type seal is created. The piping or conduit 22 is attached to the bottom cover assembly by way of a centrally disposed threaded hole so as to form an oil/water drain means to which is attached the water removal chamber assembly by way of the full port ball valve 23.

The full port ball valve means 23 allows the water that has separated from the oil in the water settling area to drop into the water removal chamber means constructed, for example, as an Aquaevac removal system. When the water removal chamber means 29 is ready to be serviced, the full view ball valve 23 is shut and the water removal chamber 29 can be removed from the bulk water/particle separator bottom cover assembly.

Figure 10:
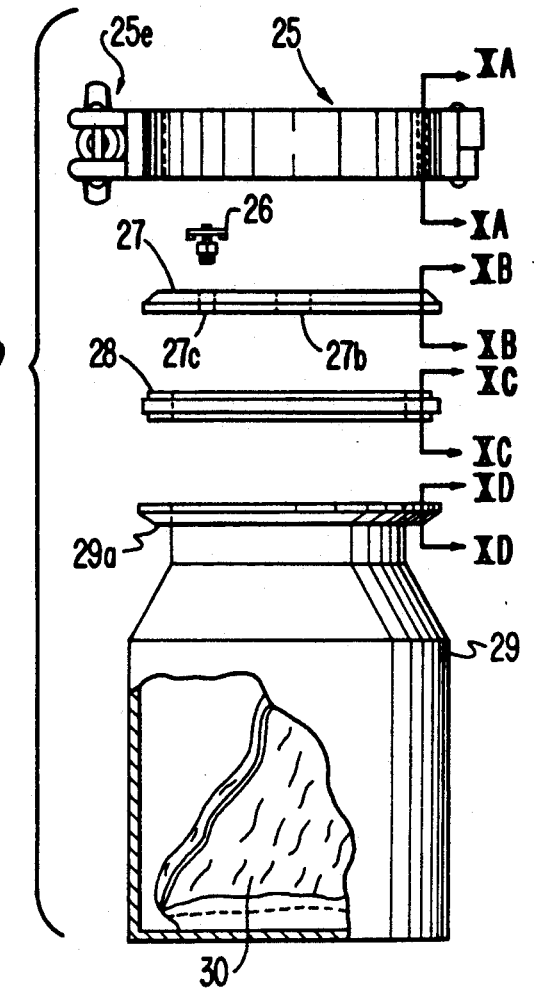
FIG. 10 is an exploded view of an Aquaevac water removal chamber constructed in accordance with the present invention.
Figure 10A:
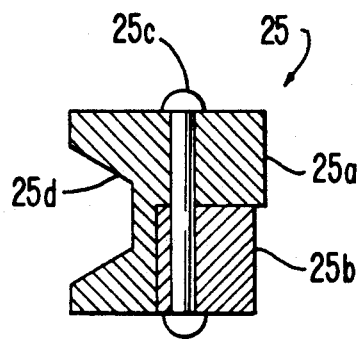
FIG. 10A is a cross-sectional view taken along the line A in FIG. 10.
Figure 10B:
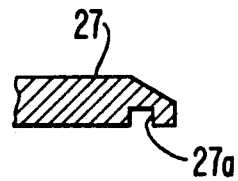
FIG. 10B is a cross-sectional view taken along the line B in FIG. 10.
Figure 10C:
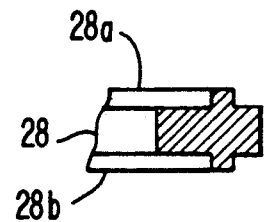
FIG. 10C is a cross-sectional view taken along the line C in FIG. 10.
Figure 10D:
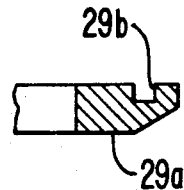
FIG. 10D is a cross-sectional view taken along the line D in FIG. 10.
Figure 13:
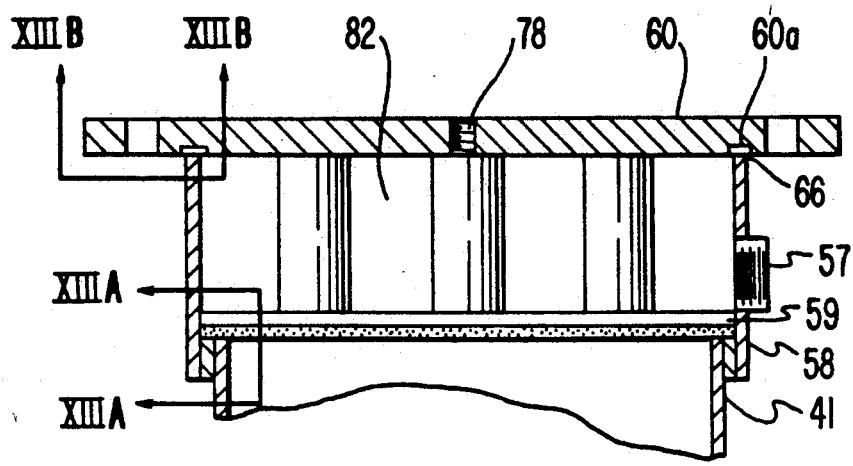
FIG. 13 is a partial cross-sectional view of a mechanical seal area assembly for the housing container constructed in accordance with the present invention.
Figure 13B:
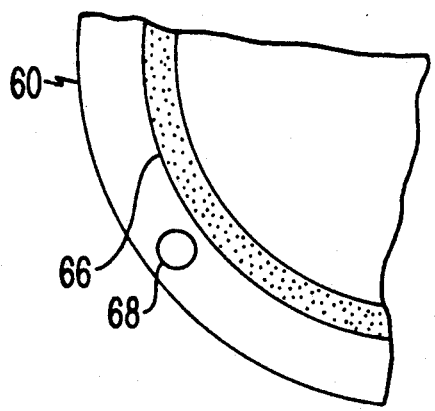
FIG. 13B is a bottom view of a housing lid cover gasket for the mechanical seal area of FIG. 13 constructed in accordance with the present invention.
Figure 13A:
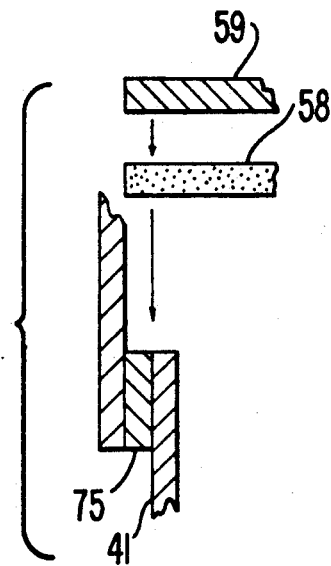
FIG. 13A is an exploded view of the components of the mechanical seal area assembly of FIG. 13.
Figure 14A:
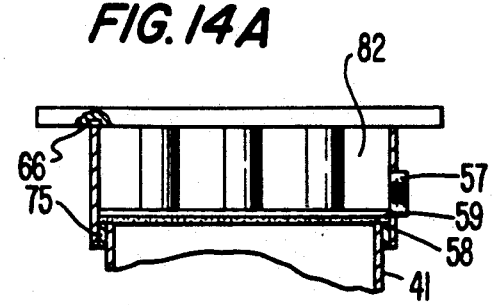
FIG. 14A is a side view of a standard container lid cover for the housing container constructed in accordance with the present invention.
Figure 14B:
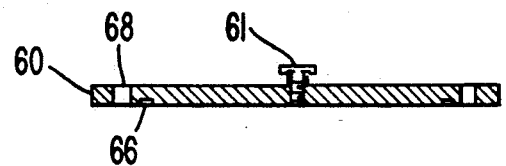
FIG. 14B is a partial cross-sectional view of the container lid cover of FIG. 14A.
Figure 14C:
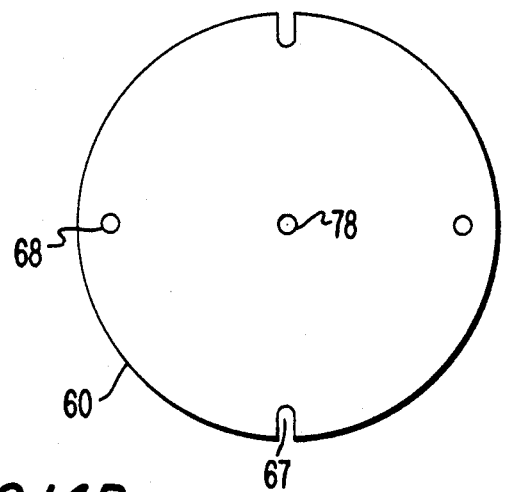
FIG. 14C is a top view of the container lid cover of FIG. 14A
Figure 14D:
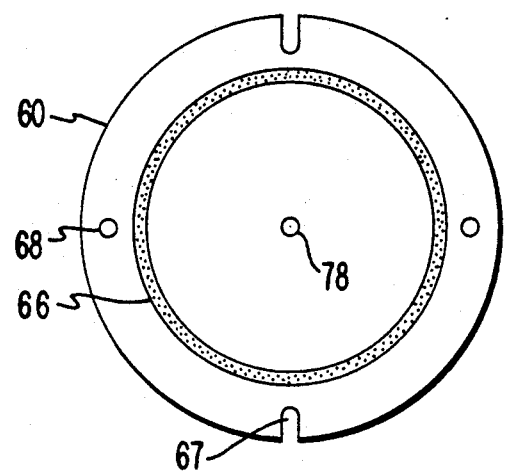
FIG. 14D is a bottom view of the container lid cover of FIG. 14A.
Figure 15A:
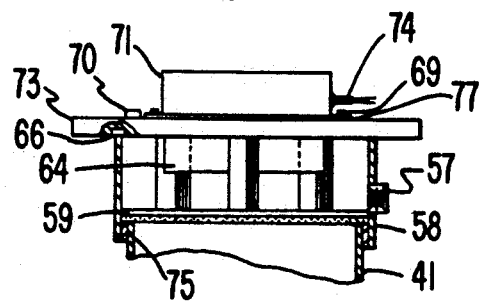
FIG. 15A is a partial cross-sectional view of a heated housing container lid for a housing container constructed in accordance with the present invention.
Figure 15B:
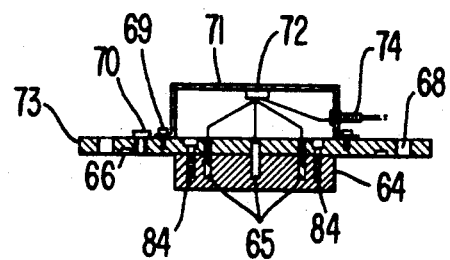
FIG. 15B is a cross-sectional view of the container lid cover of FIG. 15A.
Figure 15C:
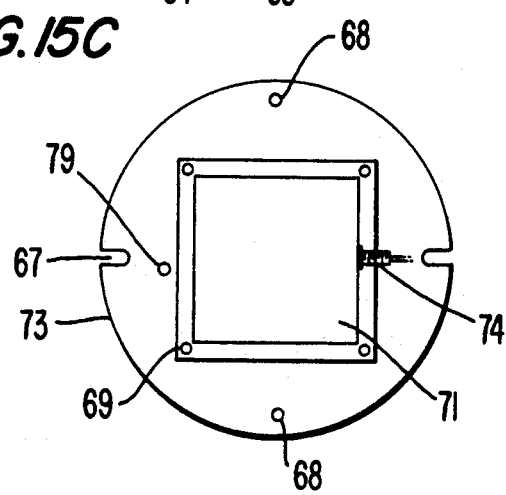
FIG. 15C is a top view of the container lid cover of FIG. 15A.
Figure 15D:
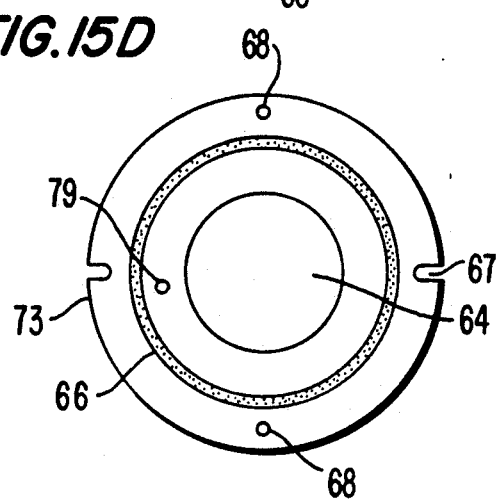
FIG. 15D is a bottom view of the housing container lid cover of FIG. 15A.

As shown in FIG. 10, the water removal chamber means 29 accommodates the water absorbent bag filter 30 which, as noted here and above, is capable of absorbing water but not oil. The water removal chamber means 29 includes a top cover assembly comprising a lid 27, sealing gasket means 28 and a V-shaped clamping ring 25. As shown in FIGS. 10B and 10D, the lid 27 is provided with a groove or notch 27a, and a flange 29a, provided at the upper end of the water removal chamber means 29, is provided with a corresponding groove or notch 29b adapted to respectively accommodate annular projections 28a, 28b (FIG. 10C) of the sealing gasket means 28. The lid 27 and the sealing gasket means 28 are secured to the flange 29a by the clamping ring 25 fashioned from two annular rings 25a, 25b, with the annular ring 25a providing a V-shaped groove 25d for accommodating the peripheral edge of the flange 29a, sealing gasket means 28, and lid 27. The two annular rings 25a, 25b are suitably joined at one peripheral portion thereof by a pin means 25c and at an opposite peripheral position by a suitable conventional fastening arrangement 25e (FIG. 10). The lid 27 also includes a threaded center hole 27b for accommodating the full port ball valve means 23. The air bleeder valve 26 is accommodated in a further threaded hole 27c provided in the lid 27. The sealing gasket means 28 fits between the grooved lid 27 and the grooved flange 29a of the water removal chamber means 29 and, when secured by the clamping ring 20 forms a vacuum tight seal.

As shown in FIG. 1, the vacuum gauge means 31 is attached to the oil outlet means 10 on the upper vertical side of the bulk water/particle separator container means 4. The positive displacement pump means 76 is attached to the vacuum gauge means, with a pressure reducing or pressure adjustment valve means 37 being connected to the positive displacement pump means 76. A flow meter means 38 is attached to the pressure reducing or pressure adjusting valve means 37, with a pressure gauge means 39 being attached to the flow meter means 38. The strobe light alarm means 33 and audible alarm 34 are attached to the electrical control switch means 35 attached to the electric motor means 36. The pressure gauge means 39 is connected to an inlet manifold 43.

As shown most clearly in FIG. 11, the housing container means 41 is provided with a square horizontal mounting base means 42 preferably provided with, for example, four ¾ inch holes stamped in each corner. The oil inlet manifold means 43 forming the inlet of the housing container means 41 is located near a bottom of the housing container means 41. The oil inlet manifold means 43 is constructed as a straight piece of pipe or conduit that enters the vertical side of the housing container means 41 extends transversely there across and through the opposite vertical side of the housing container means 41. The inlet manifold means 43 is threaded on both sides of the housing container means 41 so as to allow the oil to enter the housing means from either side. In FIG. 11, only one side of the oil inlet manifold means 43 is used and the side of the oil inlet manifold means 43 which is not used is preferably sealed off by an oil inlet manifold cap or plug means 44.

The portion of the oil inlet manifold means 43 disposed interiorly of the housing container means 41 is provided with a plurality of horizontally drilled holes 43a. While only five holes 43a have been shown in drawings, preferably eight 1/8 inch holes are provided in the oil inlet manifold preferably at a distance of one inch spacing between the respective holes 43a.

As also shown in FIG. 11, the housing container means 41 includes a drain 46 preferably mounted about one inch off the square mounting base means 42 and located at a position 90 degrees opposite the inlet for the oil inlet manifold means 43. In normal operation, only one side of the drain 46 is used, with the unused drain 46 being closed or sealed by a cap or plug 45. A pipe or conduit 47 is attached to the drain 46, and an elbow 48, preferably a 90 degree elbow, a closed couple nipple 49, and a ball valve 50 are attached to the elbow 48 so as to complete the drain assembly for the housing container 41. The oil inlet manifold means 43 and the holes 43a contained therein are arranged so as to create a 90 degree angle forming a perpendicular line the oil inlet manifold means 43 on a horizontal plane which enters through the vertical side of the housing container means 41. A 90 degree angle is also created on a perpendicular line where the oil inlet manifold means 43 on a horizontal plane exits through the vertical side of the housing container means 41. Oil from the container 4 and supplied by the positive displacement pump means 76 leaves the positive displacement means 76 and travels through the pressure reducing or pressure adjustment valve means 37 where the oil pressure is adjusted to, for example, 50–70 PSI operating pressure. The pressure gauge 39 provides a visual indication for enabling a reading of the operating pressure in the housing container means 41. The oil then leaves the pressure gauge means 39 and travels through the oil pressure piping or conduit 40 and enters the housing container means 41 at the oil inlet manifold means 43. The oil leaves the housing manifold 43 through the horizontally drilled holes 43a and then changes directions and travels vertically upwardly into a housing coalescing/settling chamber means 81 located in an area between an horizontal plane of an inside of the bottom of the housing container means 41 upwardly along the interior of the vertical housing container means 41, including an area surrounding the oil inlet manifold means 43 and ending on the horizontal surface of the bottom of a fibrous element means 52. The exact size of the coalescing chamber means 81 will vary in dependence upon the desired operating oil inlet pressure.

The oil under pressure leaving the oil inlet manifold means 43 passes through the coalescing/settling chamber means 81 and travels vertically upwardly and enters the housing container fibrous element area 51 so as to come into contact with the fibrous element 52 disposed therein. The oil pressure compresses the fibrous element means 52 by as much as one-third an original vertical height thereby creating a frictional barrier (FIG. 2) that makes it very difficult for water and every particle to pass through into the fibrous element 52 but a the oil to pass through more easily resulting in a depositing of the water and heavy particles into the coalescing/settling chamber means 81.

The blended fibrous element means 52 are placed in the housing means 41 with an open end (FIG. 12c) facing in a downward direction. The fibrous element means 52 are solid compressed elements that slide into the open end of the housing means 41 when the cover assembly thereof is removed. The fibrous element means 52 are made of a solid fibrous material hydraulically compressed into the shape of the housing means and, in particular, into the shape of the fibrous element area 51. The fibrous element means 52 are encased in bag of, for example, cotton, that permits the correct amount of stretch to seal the fibrous element means 52 into the fibrous element area 51 under the upward vertical pressure of, for example, 5000 pounds of lift exerted on the fibrous element means 52 during a normal operation thereof.

The blended fibrous element means are produced in a machine that compresses the fibrous material into a cotton bag so as to form the exact shape of the container means 41. Depending upon the blend of material, the amount of compression required determines the exact size of the fibrous element means 52 for the particular oil product or other fluid being purified or cleaned.

The fibrous element means 52 are secured at the top by a barrier filter/seal element means 58 and a dispersion hold down plate means 59. The cover assembly compresses the dispersion hold down plate means 59 which, in turn, compresses the barrier filter/seal element means 58 and the fibrous element means 52. When the entire housing container means 41 is assembled, the fibrous element means 52 are tightly compressed. The coalescing chamber means 81 is formed in the housing container means 41 where the horizontal bottom surface of the fibrous element means 52 and the coalescing chamber means 81 meet.

The oil leaves the fibrous element means 52 and flows in the barrier filter/seal element means 58 which forms the final filter and seals the fibrous element means 52 in the fibrous element area 51. This sealing represents a major improvement over conventional devices in that by sealing the fibrous element means 52 into the housing container 41, the upward lift pressure is created on the fibrous element means 52 forcing all of the oil to go through the fibrous element means 52.

The oil flows vertically up through the solid fibrous element means 52 where emulsified water that was not removed by the friction barrier (FIG. 2) is absorbed, semi-solid material such as sledges and asphaultants, solid particles down to as small as $1\mu$, salt (NaCl), and ammonia are removed and acids are neutralized. The barrier filter/seal element means 58 is an absolute $\mu$-rated material that can be manufactured in different $\mu$-ratings and from a number of different materials depending upon the nature of the oil or other fluid to be purified or cleansed.

The barrier filter/seal element 58 is fashioned of a flexible material and forms one component of a three component mechanical seal. A flange 75 of the housing container 41 is the bottom interface of the mechanical seal, the barrier filter/seal element 58 forms a central flexible part of the mechanical seal, and the dispersion/hold down plate means 59 represents the top interface of the mechanical seal. When the housing container means 41 is assembled, the barrier filter/seal element 48 forms an absolute filter which all oil that enters must pass through.

The dispersion/hold down plate means 59 holds the fibrous element means 52 and the barrier filter/seal element means 58 in the housing container means 41 and is secured in place by a housing container cover or lid 60. The dispersion/hold down plate means 59 is provided, on a surface thereof facing a cover or lid 60 of the housing container means 41, with, for example, three vertically extending legs or columns 59a, 59b, 59c. The dispersion/hold down plate means 59 maintains or holds the fibrous element means 52 and the barrier filter/seal element means 58 in the housing container means 41 and is secured in place by the cover or lid 60. An area created by the three vertical legs or columns 59a, 59b, 59c of the dispersion/hold down plate means 59 forms an evaporation/oil collection chamber 82. The oil flows upwards through the barrier filter/seal element means 58 and into oil direction passage ways 83 fashioned in the dispersion/hold down plate means 59. The oil flows upwardly through the dispersion/hold down plate means 59 and into the evaporation/oil collection chamber 82. The oil then moves horizontally at a very slow speed in an even thin layer toward an oil outlet 57 of the housing container means 41 and exits from the housing container means 41.

In the above described construction, there are two areas where coalescing of the water out of the oil or other fluid being purified takes place in the housing container means 41. The first area is where the oil leaves the oil inlet manifold means 43 and changes from a horizontal directional flow to a vertical upward flow through the coalescing/settling chamber means 81. The second area is located at a position where the incoming oil begins to meet the resistance created by the solid fibrous element means 52 resulting in an increase in the oil pressure. The increase in the oil pressure causes a tremendous hydraulic compression of the fibrous element means 52. The upward vertical compression of the fibrous element means 52 reduces the vertical height by, as noted above, as much as one-third of the original vertical height. Under a normal operating oil pressure, the hydraulic lift pressure may exceed 5000 pounds of vertical lift pressure so as to result in the creation of a frictional barrier along the bottom edge of the fibrous element means 52 which permits the oil being processed to go through much easier than the water trapped in the oil. The friction barrier creates the final or second stage of coalescing. The unique coalescing is achieved by the relationship of the incoming oil under pressure passing through oil inlet manifold means 43, the coalescing/settling chamber means 81 and the solid fibrous element means 52.

When the barrier filter/seal element means 58 is secured in place, it forms an absolute barrier to any particle trying to pass through the housing container means 41. The barrier filter/seal element means 58 performs two functions, namely, a sealing of the solid fibrous element means 52 in the vertical filter chamber in the housing container means 41 and as an absolute $\mu$-rating for enabling a particle filtration. The sealing of the solid fibrous element means 52 eliminates the possibility that any unfiltered oil will slip by the solid fibrous element means 52 and exit or be discharged from the housing container means 41 in an unfiltered state. Furthermore, by virtue of the constructional features of the housing container means, the barrier filter/seal element can be manufactured out of various materials depending solely on the type of oil or other fluid to be purified or cleansed.

The dispersion/hold down plate means 59 securing the barrier filter/seal element means 58 in the housing container means 41 is constructed as a horizontal perforated plate means preferably having a two inch band of solid non-perforated material forming the outer circumference thereof to which the three vertical leg means 59a, 59b, 59c are attached so as to extend vertically upward to engage an underside of the cover or lid 60. The vertical leg means 59a, 59b, 59c are arranged at equal angles around the non-perforated solid parameter of the dispersion/hold down plate means 59. The perforated pattern in the dispersion/hold down plate means 59 begins in a center of the plate means 59 and includes a plurality of concentric circles of, for example, punched holes or the like ending about two inches from an outer diameter of the plate means 59. The dispersion/hold down plate means 59 directs all the oil from the barrier filter/seal element means 58 into the evaporation/oil collection chamber means 82. The concentric circle pattern of the holes in the dispersion/hold down plate means 59 are constructed and arranged so as to direct all the oil entering into the evaporation/oil collection chamber 82 in a uniform depth creating a slow even flow of the oil to the oil outlet means.

FIGS. 13, 13A, 13B and 14A–14D provide an illustration of an example of one of two cover or lid assembly arrangements available for sealing the housing container means 41, with the specific cover or lid assembly being dependent upon the type of oil or other fluid to be purified or cleansed. More particularly, if the oil or other fluid to be purified or cleansed contains no volatile contaminates, then a standard contai.ner cover or lid assembly arrangement could be used wherein the cover or lid is a flat circular member provided with angular groove 60a for accommodating a container or lid cover gasket means 66. The cover or lid 60 is provided with two round holes 68 and two u-shaped cutouts or notches 67 arranged along an outer circumference of the cover or lid 60 outside of the angular groove 60a, with the u-shaped notches or cutouts 67 being adapted to respectively accommodate T-bolt lock down cover fastener means or fastener assemblies 85 (FIG. 11). A threaded hole 78 is located in a central area of the cover or lid 60 for accommodating a vent cock 61 so as to enable a ventilation of the evaporation/oil collection chamber means 82 if necessary. The lid or cover 60 compresses and holds down the dispersion/hold down plate means 59, the barrier filter/seal element means 58, and the solid fibrous element means 52 in the housing container means 41. The cover or lid 60 also forms a horizontal top of the evaporation/oil collection chamber means 82 and the horizontal top of the housing container means 41, and, along with the accommodating vertical size of the housing container means 41 seals the entire housing container means 41, with the arrangement of the dispersion/hold down plate means 59, barrier filter/seal element means 58, and flange 75 of the housing container means 41 being clearly illustrated in FIG. 13A.

In the illustrated embodiment, four T-bolt lock down fastener means 85 are provided and are attached to the upper vertical sides of the housing container means 41 at the outside of the evaporation/oil collection chamber means 82. The fastener means 85 are mounted so as to be in alignment with the two holes 68 and the two u-shaped notches or cutouts 67 provided in the cover or lid 60. The T-bolt lock down fastener means 85 each include two permanently mounted rectangular tabs or ears 56 mounted on the vertical sides of the housing container means 41, with each of the tabs or ears 56 being provided with a centrally drilled opening or aperture 56a for accommodating a retaining pin 55 adapted to be inserted through the opening 56a and through an opening in a cylindrical member 53a having welded thereto a threaded stud 53. Each retaining pin 55 is provided with two small holes at respective ends thereof for accommodating cotter pins or the like with a washer 62 and a fastening nut 63 being arranged at the upper surface of the cover or lid 60.

FIGS. 15A-15D provide an illustrated example of the second cover or lid assembly arrangement available for sealing the housing container means 41, with such cover or lid assembly arrangement serving all the same functions as the above described cover or lid arrangement but offering a benefits of creating an evaporation-/oil collection means 82 that has a heated and humidity control environment and is capable of extracting the oil being purified of any light hydrocarbon contaminates, that is, light distillates from the oil. The alternative cover or lid assembly arrangement is constructed as a heated housing cover or lid 73 and includes a T-drilled vent plug 70 which allows the vapor in the evaporation-/oil collection chamber means 82 to be removed from the housing container means 41. As shown in FIG. 15A-15D, the heated housing container cover or lid 73 is constructed of a cover plate having two mounting holes 68 and two mounting U-shaped notches or cutouts 67. The vent plug 70 is threaded into a vent plug hole 79, and a heater assembly is provided which includes an aluminum concentric block 64 secured by way of bolts 84 and sealed to an underside of the heated housing cover or lid 73. Three evenly spaced holes are provided in the top of the cover or lid 73 and extend therethrough but not through the aluminum block 64, with the holes accommodating heater rods 65 which are sealed into the holes. The heater construction of the present invention eliminates the problems encountered in conventional constructions by not allowing the oil to come into contact with the heater element. A thermostat 72 is electrically connected to the heater rods 65 and mounted to a cover box 71 provided on the cover or lid 73. The heater assembly cover box 71 is attached to the cover or lid 73 by, for example, four fasteners, and is environmentally sealed with a gasket 77. A water tight electrical connector 74 is attached to the side of the heater assembly cover box 71, and the heated housing cover or lid 73 is sealed to the housing container means 41 by way of a housing container cover gasket 66. By making all of the electrical connections with the heated cover or lid 73 water tight, it is possible for the purifier of the present invention to function in the worst environments. The cover or lid 73 differs from the cover or lid 60 by virtue of the provision of the vent plug means 70 which is disposed at the edge of the cover 73 but is still capable of venting the evaporation/oil collection chamber means 82 by allowing room for accommodating the heater assembly. The heater rods 65 are sealed in the heater rod cavity and wired to the thermostat 72 set at 200° F.

The heated cover or lid 73, as with the standard cover or lid 60 is secured to the housing container means 41 by four T-bolt fastening means 85.

The evaporation/oil collection chamber means 82 functions at its optimum with the heated cover or lid is used. The evaporation/oil collection chamber means 82 begins at the top horizontal plane of the dispersion/hold down plate means 59 and extends outwardly until it reaches the vertical walls of the interior of the housing container means 41 and then extends upwardly until the bottom surface of the cover or lid 73. The evaporation-/oil collection chamber means, when the heated cover or lid 73 is used keeps the air in the evaporation/oil collection chamber means 82 at approximately 200° F.

This then maintains the humidity in the evaporation/oil collection chamber means below 0.001%. The hot temperature also causes the light hydrocarbon distillates to turn to vapor, rise to the top of the evaporation/oil collection chamber means 82 and be vented outside of the housing container means 41 through the vent plug 70. The vent plug 70 is constructed so as to allow vapor to escape from the evaporation/oil collection chamber means 82 with a minimal restriction to vapor flow. The vent plug 70 is capable of forming a slight vacuum in the evaporation/oil collection chamber means that greatly increases the vapor emission. Liquid expands into a gas which creates a slight positive pressure in the evaporation/oil collection chamber means 82 along with a slight vacuum formed by outside air passing the sides of the vent plug 70 thereby causing a siphoning effect on the horizontal hole in the vent plug 70. An oil outlet means 57 is attached to the upper vertical sides of the housing container means 41 so that oil from the evaporation/oil collection chamber means 82 may gravity flow out of the housing container means 41.

The evaporation/oil collection chamber means 82 acts as both an oil collection area and, if the housing container means is equipped with the heated cover or lid 73, also forms an evaporation chamber for the removal of volatile contaminates. The dual purpose evaporation/oil collection chamber means allows the same housing container means 41 to be used to purify a full range of oil products. If the oil products to be purified or cleaned do not have volatile contaminates, the evaporation/oil collection chamber means may be used with a standard cover or lid 60 and function only as an oil collection chamber, collecting the cleaned oil product and passing the same to the oil outlet means 57. When the evaporation/oil collection chamber means 82 is used as an oil collection chamber, the vent cock means 61 can be closed off for allowing the oil product to fill up the entire oil collection chamber and force the cleaned oil product out of the housing container means 41.

If the oil product to be purified has light volatile contaminates, the heated container cover turns the evaporation/oil collection chamber means 82 into a very efficient evaporation chamber. The construction of the heated cover or lid 73 is such that the heated element is sealed in the concentric heat transfer block 64 that protrudes downwardly into the evaporation/oil collection chamber. Thus, the oil product that is being purified never contacts the concentric heat transfer block means 64. Moveover, the construction of the evaporation/oil collection chamber means 82 differs from conventional approaches by virtue of the relationship between the evaporation/oil collection chamber means 82, the fibrous element means 52 under pressure, the barrier filter/seal element means 58, the oil directional passage way formed in the dispersion/hold down plate means 57, and the heated cover or lid 73 along with the T-shaped vent plug 70. Light volatile contaminates are easily converted into a gas by the present invention by bringing them into the oil inlet means of the housing container means 41 under pressure at normal operating temperatures for machines or engines that would generate light volatile contaminates. When the oil enters the oil inlet means under pressure, it quickly exits the oil inlet means and travels to the frictional barrier means, passes through the frictional barrier means and enters the fibrous element means 52 where all solid particles are removed down to $3\mu$ and the lighter volatile contaminates are separated from the asphaultants, varnishes and heavy molecules of the oil product being purified. As clean hot light volatile contaminates pass through the fibrous element means 52, the pressure in housing container means 41 decreases causing the light volatile contaminates to expand and change from a light volatile liquid contaminate to a light volatile gas contaminate. As the light volatile liquid gas contaminates reach the top of the fibrous filter element means 52, the pressure that forced the same through the fibrous filter element means 52 is reduced to less than 1 pound. The light hot volatile contaminates, upon going through the barrier filter/seal element means 58 and dispersed through the oil passage way means of the dispersion/hold down plate means 57 expand into gases in the 200° F. temperature of the humidity-free evaporation/collection chamber means 82 and immediately change from a light liquid contaminate to a light gas contaminate. When liquids expand into a gas, they take up more volume of space and thereby the light gas contaminates create a slight positive pressure inside the evaporation/oil collection chamber means 82 forcing, the light gas contaminates out of the T-shaped vent plug 70 and into the surrounding environment.

The T-shaped vent plug means provides a very efficient vent system and allows almost no resistance to a gas flow and, by virtue of its T-shaped construction, the plug 78 allows a slight vacuum on the evaporation/oil collection chamber means 82 to form when outside air passing by the sides causes a siphoning effect on the horizontal holes in the T-shaped vent plug means.

In conventional constructions, the light volatile liquids are removed by having a very thin film of oil passing closely by a heated element that would flash the volatile liquids into the gas and, such conventional approaches are limited in effectiveness to remove light volatile contaminates since such approaches rely on maintaining the proper amount of oil flow through the devices. Since oil flow rates are not consistent through conventional apparatus by virtue of the reliance upon an orifice type flow control means, flow rates vary widely depending on how well the fibrous filter element means is sealed and/or how little oil was channeled through the fibrous filter element as well as the level of contaminates entering the fibrous filter element. Consequently, conventional apparatus are unable to provide a consistent flow rate and require the operation on a level surface in order to ensure the attaining of the proper thin film of oil over the evaporation plate means and the maintaining of the proper distance between the heating element and the thin film of oil. Consequently, the technical approach to the present invention is not only more efficient but less complicated and is also better suited for turning light liquid volatile contaminates into light vapor contaminates while maintaining a much larger less cluttered evaporation/oil collection chamber means to facilitate much larger volumes of light volatile contaminate removal.

When the heated lid or cover 73 is used, the electrical leads are connected to the ON/OFF electrical control switch 35.

By constructing the collection chamber means 29 as an Aquaevac water removal chamber means and by providing the piping or conduit arrangement from the bottom cover means of the bulk water/particle separator container means 4 through the full port valve means 35 so as to allow the full view valve means to be closed, it is possible to isolate the Aquaevac water removal chamber means from the bulk water/particle separator container means 4. Once the full view valve means 35 has been shut off, the Aquaevac water removal chamber means can readily be disassembled and removed by removing the top cover or lid assembly.

By virtue of the provision of the water sensors means 16 as well as the sight glass means 15, it is possible to readily determine the presence of water at a predetermined level in the water settling area of the bulk water/particle separator container means 4 so as to enable the taking of two actions, namely, the setting off of a high water warning alarm so as to shut off the positive displacement pump 76 or to open up the drain valve means 21 attached to the bottom cover means of the bulk water/particle separator container means 4.

While the bulk water/particle separator container assembly and the housing container assembly are disclosed herein as being used in conjunction so as to form a unique and novel purification arrangement, as can readily be appreciated, the bulk water/particle separator container assembly or the housing container assembly may be separately used with other conventional arrangements and still provide significant improvements over conventional oil purification and oil reclamation devices.

While I have shown and described several embodiments in accordance with the present invention, it is understood that the same is not limited thereto but is susceptible to numerous and modifications as known to one of ordinary skill in the art, and I therefore do not wish to be limited to the details shown and described herein, but intend to cover all such modifications as are encompassed by the scope of the appended claims.

What is claimed is:

1. A purification device for purifying industrial liquids from contaminants, the device comprising first receiving means for receiving a quantity of contaminated industrial liquid, means provided in said first receiving means for separating contaminants from the industrial liquid, second receiving means for receiving liquid processed by said separating means from said first receiving means, means for transferring liquid processed by said separating means from said first receiving means to said second receiving means, and filter means provided in said second receiving means for filtering remaining contaminants from the liquid and discharging the same, and wherein said first receiving means includes a first container means for receiving all of the contaminated industrial liquid in bulk, said means for separating includes a strainer means disposed directly below an inlet means of the container means for forming a mechanical filtration zone, plate passage means disposed below said strainer means for defining a mechanical coalescing means to receive the liquid out of an outlet means of said container means, and wherein lid means are secured in an upper end of said first container means for forming a vacuum tight container means.

2. A purification device according to claim 1, wherein said means for filtering filters contaminants from industrial liquids including lube oils, hydraulic oil, water insoluble oils, refrigerant oils, glycol, mineral spirits and fuel oil.

3. A purification device according to claim 2, wherein said means for separating separates contaminates including at least solid particles to $1\mu$, water, acids, semi-solids, salt (NaCl), asphaultants, ammonia, and volatile contaminates.

4. A purification device according to claim 1 wherein said means for transferring transfers the liquid from said outlet means to an inlet means of said second receiving means.

5. A purification device according to claim 4 wherein said second receiving means includes a further container means having the inlet means thereof disposed at a lower end thereof, a coalescing chamber means provided in the lower end of said further container means for receiving the liquid from the liquid inlet means thereof, said coalescing chamber means being defined between a bottom end of said further container means and a bottom end of said filter means, whereby said liquid passes from said coalescing chamber means through said filter means and is discharged from an outlet means provided at an upper end of said further container means.

6. A purification device according to claim 5, wherein said filter means includes at least one filter element fashioned of mechanically compressed fibrous materials, said at least one filter element being dimensioned with respect to a cross-sectional area of the further container means so as to preclude a channeling of liquid around said filter element.

7. A purification device according to claim 6, wherein said filter means further comprises a barrier filter seal means disposed in said, further container means at a position above said at least one filter element and defining a final filtration area for the liquid.

8. A purification device according to claim 7 further comprising a plate means disposed in said further container means above said barrier filter means for holding said barrier filter seal means and said at least one filter element in said further container means.

9. A purification device according to claim 8, in said plate means includes means for dispersing the liquid flowing from said at least one filter element through said barrier filter seal means into an a liquid collection chamber means disposed at an upper end of said further container means and communicating with the liquid outlet means thereof.

10. A purification device according to claim 9, wherein said means for dispersing includes a plurality of perforations arranged in a circular array in a central portion of said plate means, and wherein said plate means includes a solid non-perforated band surrounding said circular array of perforations.

11. A purification device according to claim 10, wherein a plurality of equal angularly spaced leg means are arranged on an upper surface of said plate means along said solid non-perforated band, said leg means being adapted to contact a bottom surface of a cover means secured to said further container means, said leg means having an axial length defining a height of said liquid collection chamber means.

12. A purification device according to claim 11, wherein a seal means is provided on said cover means for insuring a vacuum tightness of said further container means when said cover means is secured thereto.

13. A purification device according to claim 12, wherein said cover means includes heating means for heating remaining volatile components in the liquid accommodated in the liquid collection chamber means.

14. A purification device according to claim 13, wherein said heating means includes a block means concentrically disposed with respect to and sealingly secured to said cover means for accommodating a plurality of heater rod means, a thermostat means operatively connected to said heater rod means, and a T-shaped vent plug means mounted on said cover means for enabling a venting of vaporized light distillates in the liquid in the liquid collection chamber means.

15. A purification device according to claim 11, wherein said liquid inlet means of said further container means includes a liquid inlet manifold extending transversely on the lower end of said further container means, said liquid inlet manifold means being fashioned as a pipe member having a plurality of openings therein.

16. A purification device according to claim 15, wherein said plurality of openings and said pipe member are disposed in the same horizontal plane and open in a direction facing the lower most filter element.

17. A purification device according to claim 16, wherein an axial spacing between the openings in the pipe member is at least one inch.

18. A purification device according to claim 15, wherein means are provided at a position spaced above said bottom end of said further container means for enabling a draining of liquid or particulate contaminates from said further container means.

19. A purification device according to claim 18, wherein said means for transferring includes a positive displacement pump means arranged between said container means and said further container means.

20. A purification device according to claim 19, wherein means are provided for monitoring a liquid flow through the purification device.

21. A purification device according to claim 20, wherein said means for monitoring includes a liquid flow meter disposed on the pressure side of said positive displacement pump means.

22. A purification device according to claim 20, wherein means are provided for monitoring a pressure of the liquid supplied to said further container means.

23. A purification device according to claim 22, wherein said means for monitoring the pressure includes a pressure gauge disposed on the pressure line side of said positive displacement pump means.

24. A purification device according to claim 22, wherein means are provided for monitoring a condition of said strainer means.

25. A purification device according to claim 24, wherein said means for monitoring a condition of the strainer means includes a vacuum gauge disposed at the liquid outlet means of said first container means.

26. A purification device according to claim 24, wherein a contaminate settling area is provided at a lower end of said first container means at a position below said plate and passage means.

27. A purification device according to claim 26, wherein means are provided for monitoring a level of the contaminates in the settling area.

28. A purification device according to claim 27, wherein said means for monitoring a level of the contaminates in the settling area includes a sight glass means provided on said first container means.

29. A purification device according to claim 27, wherein means are provided at a lower end of said first container means for enabling a draining of the contaminates therefrom.

30. A purification device according to claim 29, further comprising an evacuation chamber means for receiving the contaminates from the lower end of said first container means, said evacuation chamber means including filter means for trapping liquid and particulate contaminates without trapping any liquid product therein.

31. A purification device according to claim 30, wherein an alarm means are provided for enabling a monitoring of the evacuation chamber means, said alarm means being actuated upon a determination of a predetermined level of liquid and particulate contaminates in the evacuation chamber means.

32. A purification device according to claim 31, wherein said alarm means is one of an audio and visual alarm.

33. A purification device according to claim 31, wherein said alarm means includes an audio and visual alarm.

34. A purification device according to claim 33, wherein said visual alarm includes a strobe light or a light indicator.

35. A purification device according to claim 31, wherein said plate and passage means in said first container means includes a first oval-shaped full plate disposed in said housing at a position below said strainer means and extending at an angle with respect to a longitudinal center axis of said first container means, a second half oval-shaped plate disposed below said strainer means and arranged at an angle with respect to said first oval-shaped plate, said second half oval-shaped terminating in an end spaced from an upper surface of said first oval-shaped plate so as to define a passage between said end and said upper surface for enabling a flow of liquid therethrough, a downwardly direct pipe means disposed at one end of said first oval-shaped plate means and communicating with the contaminate settling area, and an upwardly directed pipe means disposed at an end of said first oval-shaped plate means opposite said first end thereof and communicating with the liquid outlet means of said first container means.

36. A purification device according to claim 35, wherein said upwardly directed pipe means communicates with the liquid outlet means of said first container means through a 90° elbow means.

37. A purification device according to claim 35, wherein said first oval-shaped plate is arranged at a downwardly sloping angle of 120°.

38. A purification device according to claim 35 wherein are provided for mechanically adjusting a pressure of liquid being processed in said further container means.

39. A purification device according to claim 38, wherein said means includes a pressure reducing valve arranged on a positive line side of said positive displacement pump means.

40. A purification device according to claim 1, wherein said strainer means is a wire mesh basket having a large opening at a top end thereof so as to permit all of the liquid entering the liquid inlet means of the first container means to enter the basket.

41. A purification device according to claim 40, wherein the wire mesh basket has a substantially planer bottom portion with round concentric vertical sides and a handle means at a top side thereof extending across the opening thereof substantially at a central position of the basket.

42. A purification device according to claim 41, further comprising a gasket means secured to a lower surface of an annular flange of the basket so as to seal the basket in said first container means.

43. A purification device according to claim 42, wherein said basket is seated in said first container means by gravity.

44. A purification device according to claim 1, wherein said plate and passage means in said first container means includes a first oval-shaped full plate disposed in said housing at a position below said strainer means and extending at an angle with respect to a longitudinal center axis of said first container means, a second half oval-shaped plate disposed below said strainer means and arranged at an angle with respect to said first oval-shaped plate, said second half oval-shaped terminating in an end spaced from an upper surface of said first oval-shaped plate so as to define a passage between said end and said upper surface for enabling a flow of liquid therethrough, a downwardly direct pipe means disposed at one end of said first oval-shaped plate means and communicating with the contaminate settling area, and an upwardly directed pipe means disposed at an end of said first oval-shaped plate means opposite said first end thereof and communicating with the liquid outlet means of said first container means.

45. A purification device according to claim 44, wherein said first oval-shaped plate is arranged at a downwardly sloping angle of 120°

46. A purification device according to claim 44, wherein said downwardly directed pipe means has an inner diameter equal to at least twice an inner diameter of the upwardly directed pipe means.

47. A purification device according to claim 44, wherein said upwardly directed pipe means is constructed and arranged so as to cause a velocity of the liquid passing therethrough to be twice a velocity of the liquid discharged out of the end of the downwardly directed pipe means.

48. A purification device according to claim 47, wherein a positive displacement pump means is provided for transferring liquid from the liquid outlet means of said first container means to a liquid inlet means of said second receiving means.

49. A purification device according to claim 48, wherein a pressure reducing valve means is disposed on a pressure side of the positive displacement pump means, and a cross-over pipe means connects the pressure reducing valve means to an inlet side of the positive displacement pump means for enabling an adjustment of liquid pressure in said second receiving means.

50. A purification device according to claim 49, wherein said pressure reducing valve means is manually adjustable to allow the correct pressure and liquid flow volume to enter the second receiving means.

51. A purification device according to claim 49, wherein a liquid flow meter means is attached to the pressure reducing valve means for enabling a monitoring of liquid flow through the purification device.

52. A purification device for purifying industrial liquids from contaminants, the device comprising the first receiving means for receiving a quantity of contaminated industrial liquid, means provided in said first receiving means for separating contaminants from the industrial liquid, second receiving means for receiving liquid processed by said separating means from said first receiving means, means for transferring liquid processed by said separating means from said first receiving means to said second receiving means, and filter means provided in said second receiving means for filtering remaining contaminants from the liquid and discharging the same, wherein said second receiving means includes a substantially cylindrical housing container having a liquid inlet means disposed at a lower end thereof for receiving liquid from said first receiving means, asid filter means includes at least one filter element fashioned of mechanically compressed fibrous materials, said at least one filter element being sidably received in said housing container and being dimensioned with respect to a cross-sectional area of the housing container so as to preclude a channeling of liquid around said at least one filter element.

53. A purification device according to claim 52, wherein a coalescing chamber means is provided in a lower end of the housing container for receiving liquid from the liquid inlet means, said coalescing chamber means being defined between a bottom end of said housing container and a bottom end of said at least one filter element, and wherein a boundary between said bottom end of said at least one filter element and said coalescing chamber means forms a frictional barrier allowing light liquid products having less static tension than a contaminate liquid to pass through thereby separating the liquid contaminate from the liquid such that the separated liquid contaminate settles in the coalescing chamber means.

54. A purification device according to claim 53, wherein said frictional barrier means prevents solid particles above 50μ from entering the at least one filter element.

55. A purification device according to claim 54, wherein a positive displacement pump means is provided for supplying liquid from the first receiving means to the liquid inlet means of the housing container in an amount sufficient to create a hydraulic pressure acting on the at least one filter element at least equal to 5,000 PSI.

56. A purification device according to claim 54, wherein a pressure reducing valve means is connected to the positive displacement pump means for enabling an adjustment of the liquid pressure in said housing container.

57. A purification device according to claim 56, wherein said pressure reducing valve means is adjustable with an operating pressure range of 5 to 90 PSI so as to initially create a liquid flow rate into the inlet means of the housing container to initially create a back-up in the coalescing chamber means thereby compressing the at least one filter element against side walls of the housing container to preclude the flow of liquid through said at least one filter element.

58. A purification device according to claim 57, wherein said at least one filter element is constructed such that liquid passing through the at least one filter element is devoid of any particulate in a range of 3 to 5μ.

59. A purification device according to claim 58, wherein said at least one filter element is constructed so as to reduce a pressure and velocity of liquid passing therethrough such that the pressure of the liquid at a top of the at least one filter element is less than 1 PSI.

60. A purification device according to claim 59, wherein at least two filter elements are arranged in series in said housing container.

61. A purification device according to claim 60, wherein each filter element is fashioned as a cylindrical member encased in a material bag.

62. A purification device according to claim 61, wherein said bag is made of a cotton material and includes a lip at an opening thereof, a cord means is provided at said lip, said cord means being adapted to be drawn tightly around said filter element while leaving a small opening in a center area of the bag.

63. A purification device for purifying relatively lighter industrial liquids from relatively heavier liquid and particulate contaminates therein, the device comprising a housing container for receiving contaminated industrial liquid in bulk through an inlet means, strainer means disposed below said inlet means for receiving all of the industrial liquid from said inlet means and for subjecting the same to a mechanical filtration, means for separating liquid and particulate contaminates from the industrial liquid including plate means for directing the industrial liquid flow downstream of the strainer means initially in a downward direction and causing the industrial liquid to change direction during its downward flow thereby allowing the liquid and particulate contaminates to coalesce out of the industrial liquid, means disposed at a lower end of the housing container for collecting the liquid and particulate contaminates, and means disposed at an upper end of the housing container for removing processed industrial liquid from said housing container.

64. A purification device according to claim 63, wherein said means for separating liquid and particulate contaminates from the industrial liquid includes a first oval-shaped full plate disposed in said housing at a position below said strainer means and extending in an angle with respect to a longitudinal center axis of said housing container, a second half oval-shaped plate disposed below said strainer means and arranged at an angle with respect to said first oval-shaped plate, said second half oval-shaped plate terminating in an end spaced from an upper surface of said first oval-shape plate so as to define a passage between said end and said upper surface, a first downwardly directed pipe means disposed at one end of said first oval-shaped plate means and communicating with a contaminate settling area disposed at the lower end of the container and forming said means for collecting the liquid and particulate contaminates, and an upwardly directed pipe means disposed at an end of said first oval-shaped plate opposite said first end thereof and communicating with a liquid outlet means of said housing container.

65. A purification device according to claim 64, wherein said upwardly directed pipe means communicates with the liquid outlet means of said housing container through a 90° elbow means.

66. A purification device according to claim 64, wherein said first oval-shaped plate means is arranged at a downwardly sloping angle of 120°.

67. A purification device according to claim 66, wherein said downwardly directed pipe means has an inner diameter equal to at least twice an inner diameter of the upwardly directed pipe means.

68. A purification device according to claim 67, wherein said strainer means includes a wire mesh basket having a large opening at a top end thereof so as to permit all of the liquid entering the liquid inlet means of the housing container to enter the basket.

69. A purification device according to claim 68, wherein the wire mesh basket has a substantially planer bottom portion with round concentric vertical sides and a handle means at a top side thereof in extending across the opening thereof substantially at a central portion of the basket.

70. A purification device according to claim 69, further comprising a gasket means secured to a lower surface of an annular flange of the basket so as to seal the basket in said housing container.

71. A purification device according to claim 70, wherein said basket is seated in said housing container by gravity.

72. A purification device for purifying industrial liquids from contaminates, the device comprising a housing container having an industrial liquid inlet means disposed at a lower end thereof, a coalescing chamber means provided in the lower end of said housing container for receiving the industrial liquid from the inlet means, at least one filter element disposed across the housing container for purifying the industrial liquid flowed therethrough, said coalescing chamber means being defined between a bottom end of said housing container and a bottom end of said at least one filter element, and pump means for pressurizing the liquid supplied to said inlet means to cause said liquid to flow from said coalescing chamber through said filter element whereby said liquid passes from said coalescing chamber means through said filter element and is discharged from an outlet means provided at an upper end of said housing container.

73. A purification device according to claim 72, wherein said at least one filter element is fashioned of mechanically compressed fibrous materials, said at least one filter element being dimensioned with respect to a cross-sectional area of said housing container so as to preclude a channeling of oil around said at least one filter element.

74. A purification device for purifying industrial liquids from contaminants, the device comprising a housing container having an industrial liquid inlet means disposed at a lower end thereof, a coalescing chamber means provided in the lower end of said housing container for receiving the industrial liquid from the inlet means at least one filter element disposed across the housing container for purifying the industrial liquid flowed therethrough, said coalescing chamber means being defined between a bottom end of said at least one filter element whereby said liquid passes from said coalescing chamber means through said filter element and is discharged from an outlet means provided at an upper end of said housing container, and wherein said at least one filter element is fashioned of mechanically compressed materials, said at least one filter element being dimensional with respect to a cross-sectional area of said housing container so as to preclude a channel of liquid around said at least one filter element, and wherein a barrier filter seal means is disposed in said housing container at a position above said at least one filter element and defines a final filtration area for the liquid.

75. A purification device according to claim 74, further comprising a plate means disposed in said housing container above said barrier filter seal means for holding said barrier filter seal means and said at least one filter element in said housing container.

76. A purification device according to claim 75, wherein said plate means includes means for dispersing the liquid flowing from said at least one filter element through said barrier filter seal means into a liquid collection chamber means disposed at an upper end of said housing container and communicating with the liquid outlet means thereof.

77. A purification device according to claim 76, wherein said means for dispersing includes a plurality of perforations arranged in a circular array in a central portion of said plate means, and wherein said plate means includes a solid non-perforated band surrounding said circular array of perforations.

78. A purification device for purifying industrial liquids from contaminants, the device comprising a housing container having a liquid inlet means disposed at a lower end thereof, a coalescing chamber means provided in the lower end of said housing container for receiving the liquid from he liquid inlet means, at least one filter element disposed in the housing container, said coalescing chamber means being defined between a bottom end of said housing container and a bottom end of said at least one filter element, wherein liquid passes from said coalescing chamber means through said filter means and is discharged from an outlet means provided at an upper end of said housing container, said at least one filter element is fashioned of mechanically compressed fibrous materials, said at least one filter element being dimensioned with respect to a cross-sectional area of said housing container so as to preclude a channeling of liquid around said at least one filter element, a barrier filter seal means is disposed in said housing container at a position above said at least one filter element and defines a final filtration area for the liquid, a plate means is disposed in said housing container above said barrier filter seal means for holding said barrier filter seal means and said at least one filter element in said housing container, said plate means including means for dispersing the liquid flowing from said at least one filter element through said barrier filter seal means into a liquid collection chamber means disposed at an upper end of said housing container and communicating with the liquid outlet means thereof, said means for disbursing includes a plurality of perforations arranged in a circular array in a central portion of said plate means, said plate means further including a solid non-perforated band surrounding said circular array of perforations, and wherein a plurality of equal angularly spaced leg means are arranged on an upper surface of said plate means in the solid non-perforated band area thereof, said leg means being adapted to contact a bottom surface of a cover means secured to said housing container, said leg means having an axial length defining a height of said liquid collection chamber means.

79. A purification device according to claim 78, wherein a seal means is provided on said cover means for insuring a vacuum tightness of said housing container when said cover means is secured thereto.

80. A purification device according to claim 79, wherein said cover means includes heating means for heating remaining volatile components in the liquid accommodated in the liquid collection chamber means.

81. A purification device according to claim 80, wherein said heating means includes a block means concentrically disposed with respect to and sealingly secured to said cover means for accommodating a plurality of heater rod means, a thermostat operatively connected to said heater rod means, and a T-shaped vent plug means mounted on said cover means for enabling a venting of vaporized light distillates in the liquid collection chamber means.

82. A purification device according to claim 80, wherein said liquid inlet means of said housing container includes a liquid inlet manifold extending transversely of the lower end of said housing container, said liquid inlet manifold being fashioned as a pipe member having a plurality of openings therein.

83. A purification device according to claim 82, wherein said plurality of openings in said pipe member are disposed in the same horizontal plane and open in a direction facing said at least one filter element.

84. A purification device according to claim 83, wherein means are provided at a position spaced above said bottom end of said housing container for enabling a draining of liquid and particulate contaminates from said further container means.

* * * * *